(12) United States Patent
Shonnard

(10) Patent No.: US 8,056,308 B2
(45) Date of Patent: Nov. 15, 2011

(54) APPARATUS AND METHOD FOR CUTTING AND HARVESTING INFESTATIONS OF AQUATIC VEGETATION AND/OR SKIMMING ALGAE/FLOATING VEGETATION

(75) Inventor: Clarence W. Shonnard, Vergennes, VT (US)

(73) Assignees: Clarence Shonnard, Vergennes, VT (US); John W. Shonnard, Carlton, PA (US)

( * ) Notice: Subject to any disclaimer, the term of this patent is extended or adjusted under 35 U.S.C. 154(b) by 413 days.

(21) Appl. No.: 11/716,944

(22) Filed: Mar. 12, 2007

(65) Prior Publication Data
US 2008/0223011 A1 Sep. 18, 2008

(51) Int. Cl.
*A01D 44/00* (2006.01)

(52) U.S. Cl. ............................................. 56/8

(58) Field of Classification Search ............... 56/8, 9, 56/257, 264, 296
See application file for complete search history.

(56) References Cited

U.S. PATENT DOCUMENTS

| | | | |
|---|---|---|---|
| 2,065,733 A | 12/1936 | Pearson | |
| 2,332,561 A * | 10/1943 | Drott | 37/406 |
| 2,702,975 A | 3/1955 | Friesen | |
| 2,790,297 A | 4/1957 | Gardner | |
| 3,221,485 A * | 12/1965 | Jenkins | 56/400.06 |
| 3,238,708 A | 3/1966 | Zickefoose | |
| 3,601,956 A | 8/1971 | Akermanis | |
| 3,863,237 A | 1/1975 | Doerr | |
| 4,137,693 A | 2/1979 | Thompson et al. | |
| 4,375,299 A | 3/1983 | Laven | |
| 4,583,353 A | 4/1986 | Shaver | |
| 4,616,588 A | 10/1986 | Caddick | |
| 4,696,149 A | 9/1987 | Hawk | |
| 4,852,337 A | 8/1989 | Peterson | |
| 4,945,996 A | 8/1990 | Codding | |
| 4,999,982 A | 3/1991 | Kriger | |
| 5,189,867 A | 3/1993 | Schmidt | |
| 5,287,935 A | 2/1994 | Foeller | |
| 5,404,696 A | 4/1995 | Vasby | |
| 5,493,850 A | 2/1996 | Torkelson | |
| 6,250,054 B1 | 6/2001 | Kramer | |
| 6,672,039 B1 | 1/2004 | Shonnard | |
| 6,920,744 B2 | 7/2005 | Shonnard | |
| 2005/0097872 A1 * | 5/2005 | Shonnard | 56/8 |
| 2006/0111217 A1 * | 5/2006 | Wen | 475/207 |

FOREIGN PATENT DOCUMENTS

FR 2643215 A1 * 8/1990

* cited by examiner

*Primary Examiner* — Alicia Torres

(74) *Attorney, Agent, or Firm* — Saile Ackerman LLC; Stephen B. Ackerman; Rosemary L.S. Pike

(57) ABSTRACT

A harvester and method for harvesting aquatic algae or floating vegetation in shallow areas of water bodies, such as lakes. The harvester is manually operated. The harvester includes a pair of blades which are manually moved by a rope connected to an extension spring, a compressed gas cylinder or the harvester wheels through a metal rod driven system. The harvester provides improved hydraulic flow through a hydraulic friction reducing plastic or metal sheet, a movable plastic or metal bar to adjust the volume of water allowed into the apparatus and vertical hydraulic flow guides to improve flow of water through the apparatus. The aquatic algae or floating vegetation is collected on the harvester, removed from the harvester, dewatered and used for compost in garden and agricultural activities.

12 Claims, 17 Drawing Sheets

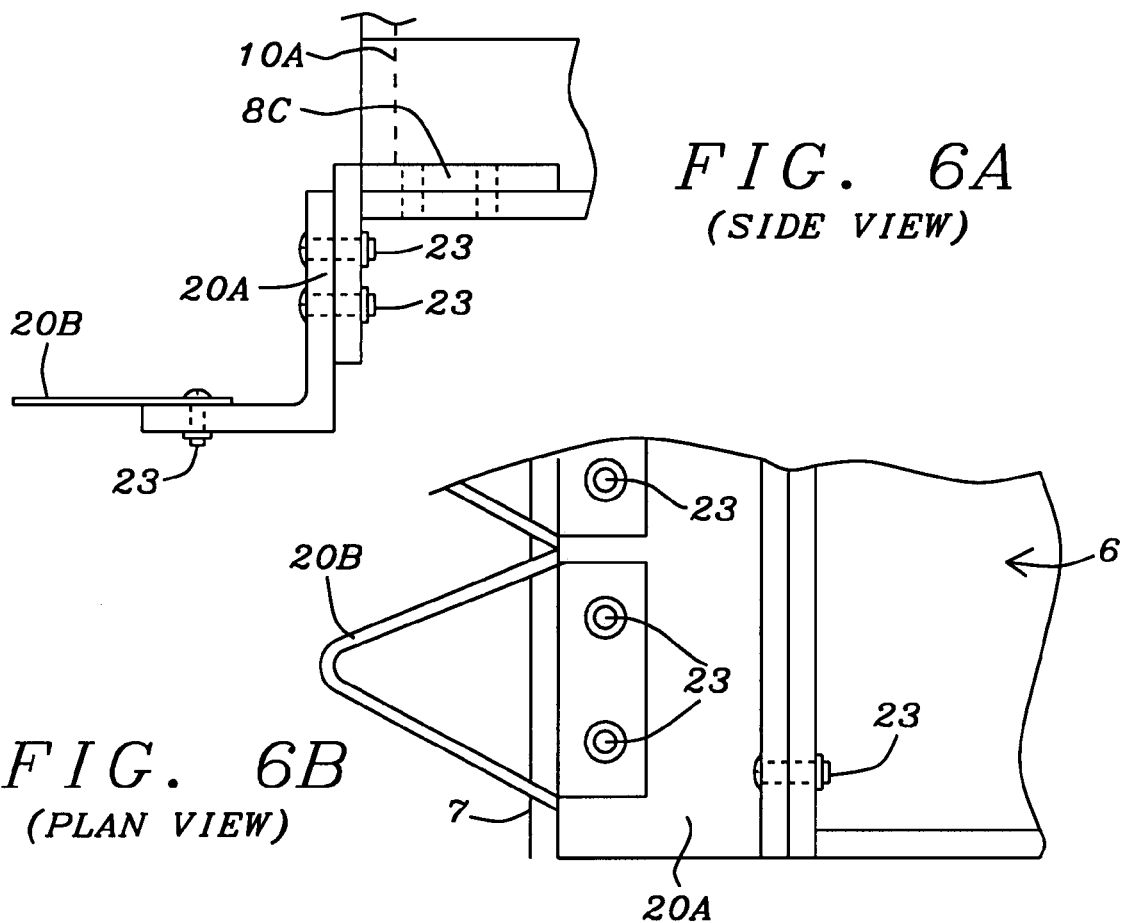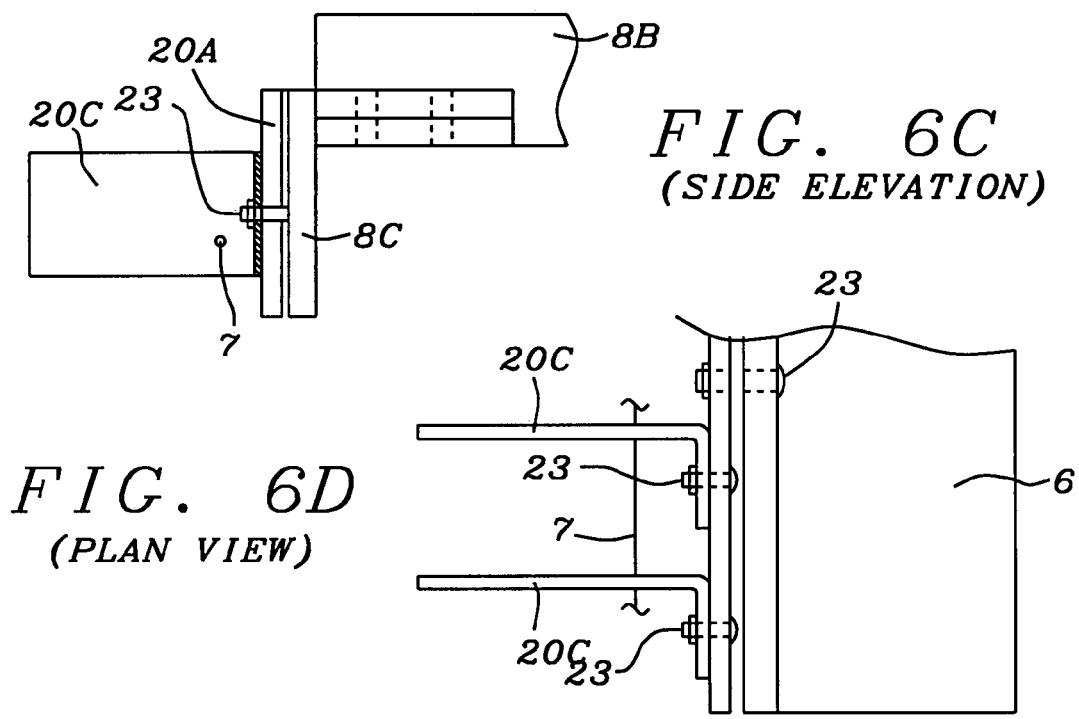

(SIDE ELEVATION VIEW)

(FRONT ELEVATION VIEW)

SIDE VIEW

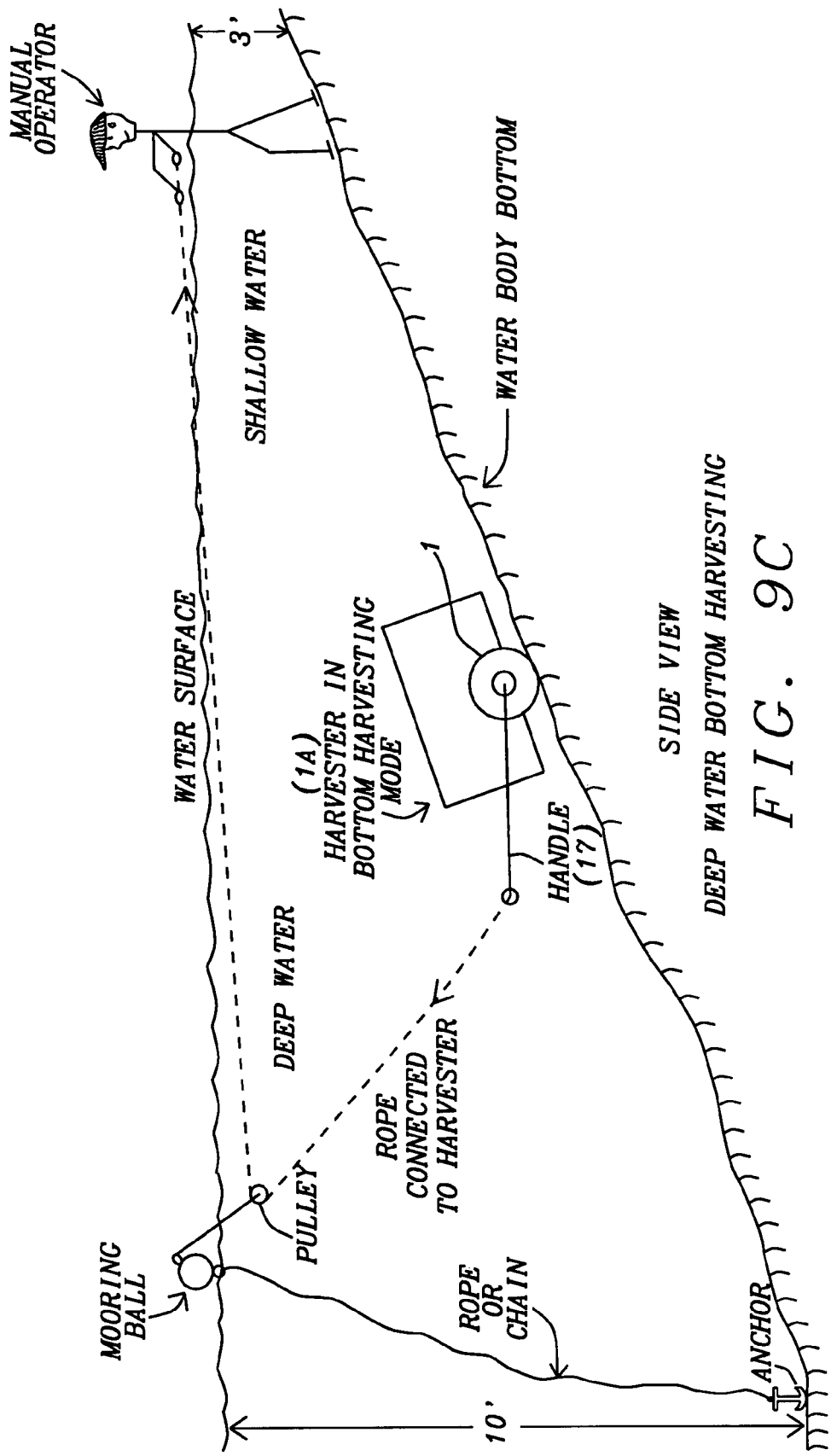

APPARATUS AND METHOD FOR CUTTING AND HARVESTING INFESTATIONS OF AQUATIC VEGETATION AND/OR SKIMMING ALGAE/FLOATING VEGETATION

RELATED PATENTS

This patent application is related to earlier U.S. Pat. No. 6,672,039, by Clarence W. Shonnard and entitled APPARATUS AND METHOD FOR CUTTING AND HARVESTING INFESTATIONS OF AQUATICS VEGETATION IN SHALLOW AREAS OF WATER BODIES, and U.S. Pat. No. 6,920,744, by Clarence W. Shonnard and entitled APPARATUS AND METHOD FOR CUTTING AND HARVESTING INFESTATIONS OF AQUATIC VEGETATION AND/OR SKIMMING ALGAE/FLOATING VEGETATION, both of which are herein incorporated by reference in their entirety.

BACKGROUND OF THE INVENTION (1) Field of the Invention

The invention relates to an apparatus and method for cutting and harvesting infestations of bottom growing aquatic vegetation and/or skimming algae/floating vegetation in shallow areas of water bodies.

(2) Description of the Related Art

Bottom growing nuisance aquatic plants and floating algae/floating vegetation and degradation of waters for swimming, boating, fishing, aesthetic and health aspects by lake users and waterfront property owners. Currently these plants can be removed by physical, mechanical, chemical and biological methods each with significant drawbacks.

Physical methods, such as barriers disturb water-bottom ecology and often result in gassing of decomposing plant like vegetation under the barrier. Examples of such mat material are filtration mats, discarded rugs and thin sheets of metal plate.

Mechanical bottom cutting and drag devices such as commonly used rake like tools and typical garden type cultivators that have transverse bars, tines and handles stir up bottom sediments which release nutrients back into the waters and disturb water bottom ecology. These nutrients enhance further aquatic plant growth and digging up the bottom sediments can have a negative impact on the lake bottom ecology.

The following patents are examples of bottom, metal, drag-type cutters which dig up bottom sediment as well as not integrally harvesting the floating cut aquatic plants. These floating plants can then reestablish themselves in other areas of the water body. A further disadvantage of these water bottom drag-type cutters is that they are prone to be blocked or other wise interfered with during digging by rocks, logs and debris that have accumulated on the lake bottom. U.S. Pat. No. 6,250,054 Kramer; U.S. Pat. No. 2,065,733 Pearson; U.S. Pat. No. 2,702,975 Friesen; U.S. Pat. No. 2,790,297 Gardner; U.S. Pat. No. 3,601,956 Akermanis; U.S. Pat. No. 3,601,956; U.S. Pat. No. 4,137,693 Thompson et al; U.S. Pat. No. 4,375,299 Laven; U.S. Pat. No. 3,863,237 Doer; U.S. Pat. No. 4,696,149 Hawk; U.S. Pat. No. 4,852,337 Peterson; U.S. Pat. No. 5,189,867 Schmidt; and U.S. Pat. No. 5,493,850 Torkelson; each show methods for cutting plants using a drag bar with a cutting edge. U.S. Pat. No. 4,999,982 Kriger describes the use of a dragging bar grate for cutting aquatic plants. U.S. Pat. No. 4,583,353 Shaver shows a triangular drag bar for cutting plants.

Chemical and biological methods are under investigation. However, there is concern about these methods, because of questions of effectiveness, damage to water ecology, known and unknown water-related human health impacts and possible liability considerations for the user.

Another type of plant cutting involves the commercial mechanical lake weed harvesters having reciprocating knives and conveyors. These machines with on-board power are heavy, complicated, costly and hazardous. Further, these machines are often unworkable in shallow areas of lakes and other bodies of water, because of hydraulic boat draft problems resulting in grounding of the harvester and engine cooling water problems from intake of lake bottom sediments into the engine. Examples of commercial powered and mechanized lake weed harvesters are U.S. Pat. No. 4,616,588 Caddick; U.S. Pat. No. 3,238,708 Zickeford; and U.S. Pat. No. 5,404,696 Vasby. These harvesting units are expensive, require considerable maintenance, need US Coast Guard permits in US navigable waters and require marine Workman's Compensation insurance under the Jones Act.

There are also wheeled garden rakes that are used on dry land. Codding U.S. Pat. No. 4,945,996 and Foeller U.S. Pat. No. 5,287,935 are examples of such dry land garden rakes, which disturb lake bottom ecology.

SUMMARY OF THE INVENTION

A principal object of the present invention is to provide an effective and very manufacturable at a reasonable cost apparatus and method for using the same for cutting and harvesting infestations of aquatic floating algae and vegetation in shallow areas of water bodies, such as lakes.

A further object of the invention is to provide an improved, versatile, light-weight multifunctional harvesting device and method for skimming floating algae and other floating growing aquatic plants that minimizes the problems of the current practices and can be operated manually by one person in shallow waters.

A still further object of the present invention is to increase harvesting efficiency by providing planar transverse back and forth manual movement of triangular cutting blades/knives.

The cutter blade arrangement of this invention provides manual planar transverse back and forth movement of triangular or other cutting devices to improve plant stem cutting/abrading efficiency. These manual methods include (1) one or more rope pulley sheave systems connected to cutting blades which in turn are mechanically connected to extension spring and the harvesting apparatus; (2) a compressed gas cylinder, piping, valve and extension/compression spring system; (3) harvester wheel cam that on rotation contacts a gas activated valve mechanically connected to metal rod driven system, and cutting blade attached to extension spring that is fastened to harvester apparatus.

A further object of the present invention is to provide enhanced hydraulic flow into and through the apparatus enclosure to maximize cutting and collection efficiency of harvested aquatic vegetation in both lake bottom cutting and surface skimming operations.

The harvester described in this invention provides improved hydraulic flow into and through the apparatus enclosure that enhances cutting and collection efficiency of harvested aquatic vegetation which are subject to water body currents. This improvement is accomplished by (1) reducing hydraulic friction through use of smooth plastic/metal sheet for sides, top and deck of harvester enclosure and use of flexible plastic grid with variable mesh-size openings at back end of harvester for different types of aquatic vegetation; (2) providing a moveable plastic/metal bar at the front end of the harvester that can be positioned vertically between the harvester deck and front end cutting device that adjusts the ratio of volume of lake water that flows into the apparatus enclosure and the volume of water that flows under the harvester deck; (3) providing floatable vertical hydraulic flow guides set at selected angles from the apparatus vertical that improves movement of floating algae and aquatic vegetation into the harvester functioning as a hydraulic scoop in the skimming mode.

These objects are accomplished by providing an improved harvesting apparatus that cuts or skims from the water surface aquatic plants at a predetermined distance above the lake or the like bottom using a planar horizontal deck with a plurality of closely spaced planar plastic/metal bars that efficiently guide the plant stems into confined spaces between the plurality of transverse bars until the stems become compacted within the spaces between the bars and eventually against the transverse stainless steel filaments or triangular knife positioned at a predetermined distance from the distal end of the metal deck bars where the steel filaments cut the wedged plant stems. The harvesting device with planar metal deck bars and transverse cutting devices provides underwater cutting of the plant stems by movement of the harvester in either the forward or the reverse direction of motion with attachable cutting devices at both ends of the harvester.

A flexible removable plastic grid integral with the harvester collects the cut or skimmed algae or aquatic plants containing phosphorus and retains the plants until transported on the harvester to an onshore location for manual dumping by simple removal of the appropriate segments of the flexible plastic grid to the front or to the back of the harvester. The cut or skimmed plants can then be dewatered, composted and the contained phosphorus used for garden or other agricultural purposes or potential use of the aquatic biomass as alternative fuel.

The harvester is provided with air-filled or a combination of water and air filled plastic wheels for easy mobility and buoyancy adjustment that can be moved by one person across the bottom of the water body to minimize the disturbance of the lake bottom sediment ecology as well as passing over obstacles of rocks, logs and debris on the lake bottom and that can be used to float the harvester so that algae and floating vegetation can be skimmed from the water surface.

The harvester can be operated by one person in the water bottom or water skimming mode using a rigid handle that can move up or down vertically over a 180 degree arc for pulling or pushing the harvester apparatus in the forward or reverse direction as needed, with or without the use of onshore auxiliary power and that cuts aquatic plants moving in either direction. The accessory plant cutting attachments needed for variation in plant stem cutting characteristics can be attached, such as with bolts to either end of the harvester deck.

The harvester buoyancy is balanced by the apparatus's weight and hydraulic buoyant forces by use of hollow plastic wheels having air/water therein added to the deck that optimizes wheel penetration into the bottom sediments thereby enhancing manual mobility of the harvester by one person in shallow waters. This also minimizes the disturbance of the water body bottom sediment ecology.

BRIEF DESCRIPTION OF THE DRAWINGS

In the accompanying drawings forming a material part of this description, there are shown:

FIGS. 6A, 6B, 6C and 6D display assembly details by elevation and plan views of two methods of the invention for cutting aquatic plant stems using easy bolt-on bars.

FIGS. 9A, 9B and 9C show side and overhead views for operating the harvesting apparatus in both the bottom and skimming harvesting modes.

FIGS. 11B, and 11C illustrate the relative vertical assembly of the cutting method with triangular aquatic plant collection guide bar supported on top of metal support angle bar, then triangular cutting blades are supported on top of the plastic/metal plant stem collection guide bar with moveable lower blade connected to rope pulley sheave system and the other end mechanically connected to the extension spring which in turn is fastened to the harvester support angles. The top cutting blade in this case rests and is fixed attached to the harvesting apparatus.

DESCRIPTION OF THE PREFERRED EMBODIMENTS

The preferred embodiments disclose the novel multifunctional manual mobile harvesting device for lake or the like bottom growing plants and methods that guide the plant stems into a cutting device above the water body bottom in shallow areas, collects the cut aquatic plants for transport to onshore sites removing phosphorus and other nutrients from the water bodies. The harvester can also be floated by means of plastic air filled wheels that allow skimming of the algae or other floating vegetation on the water. Eventually the collected plants can be composted for garden and agricultural or future biomass energy alternatives. The harvester can be operated by a single person with or without onshore power devices.

Figure 1A:
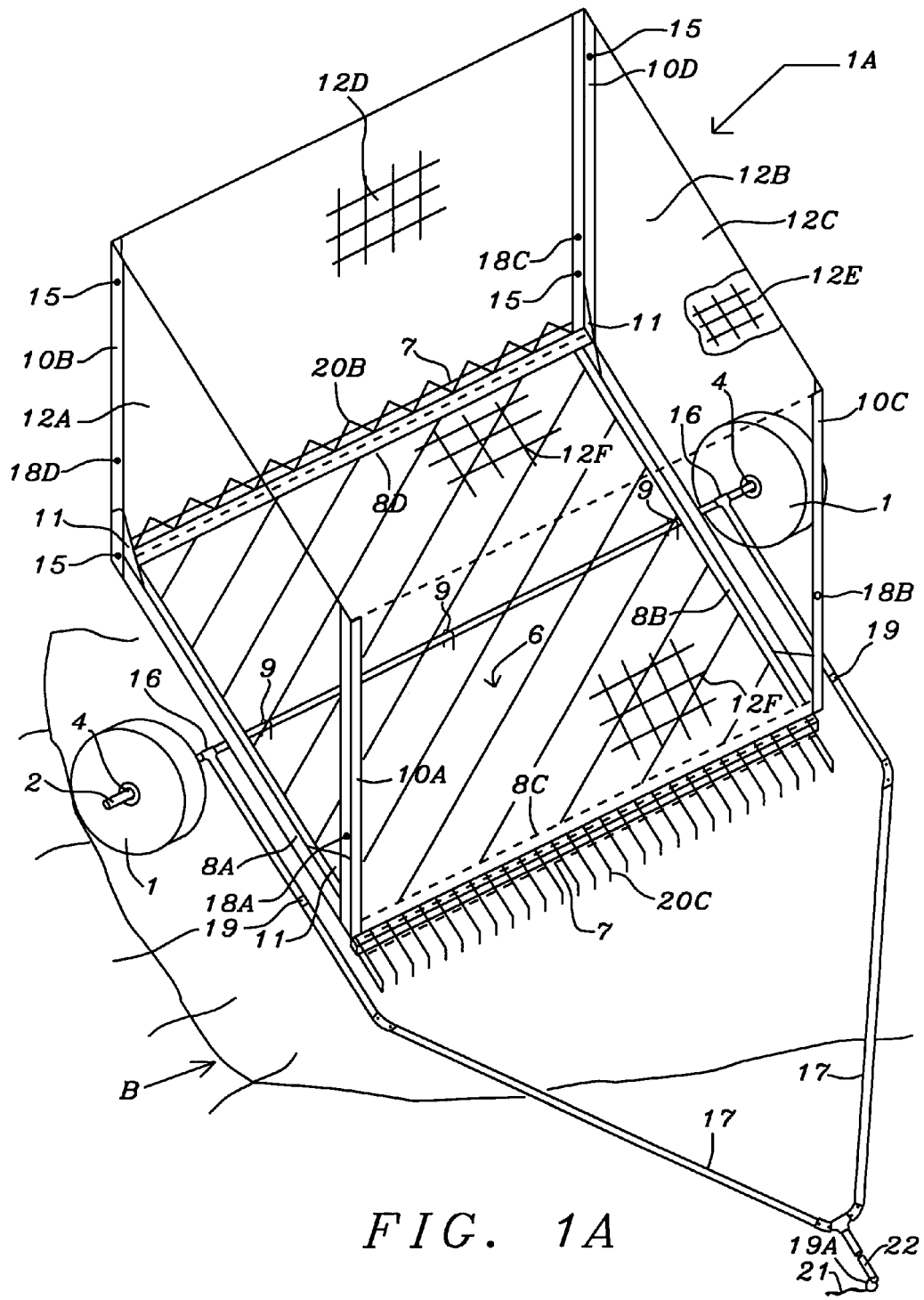
FIG. 1A is a perspective view of the aquatic plant cutting and harvesting apparatus of the present invention.

Referring now more particularly to FIGS. 1A through 7B and in particular to FIG. 1A there is illustrated a mobile, multifunctional apparatus and method for cutting and harvesting nuisance bottom growing aquatic plants. The harvesting apparatus includes a frame attached to an axle 2 by for example "U" bolts 9. Wheels 1 on axle 2 are held in place by washers 4 and cotter pins 3 to provide mobility for the harvester 1A.

Figure 2A:
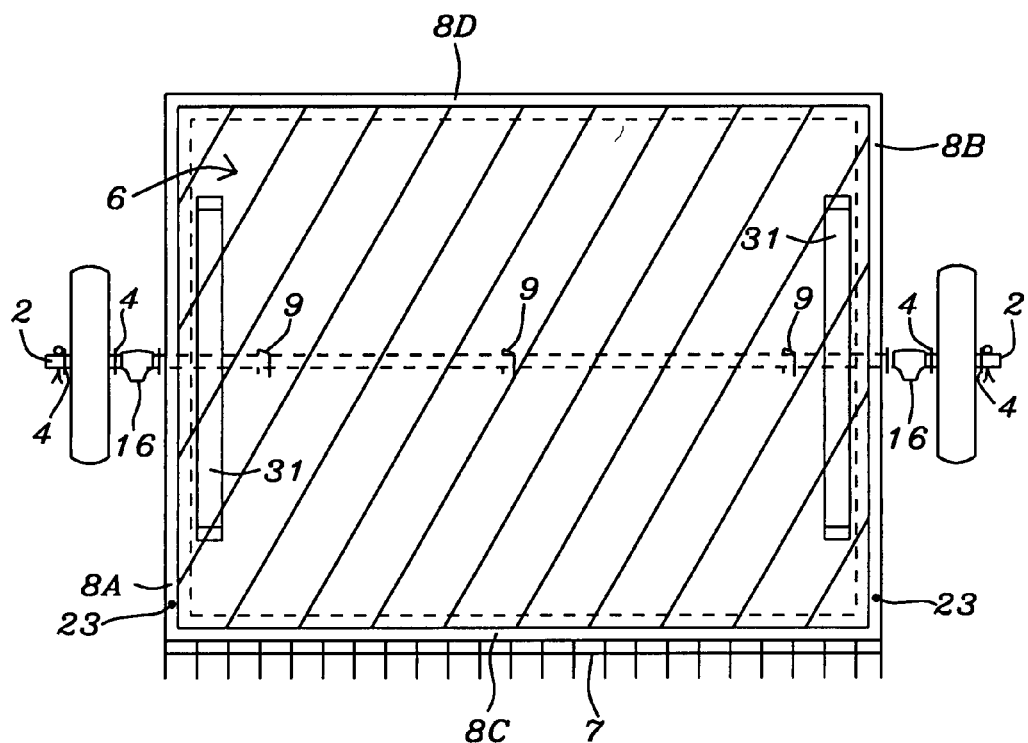
FIG. 2A shows a plan view of the harvesting apparatus including hollow wheels and optional floatation and/or weight adjustment device of pipe tube being water or air filled.
Figure 2B:
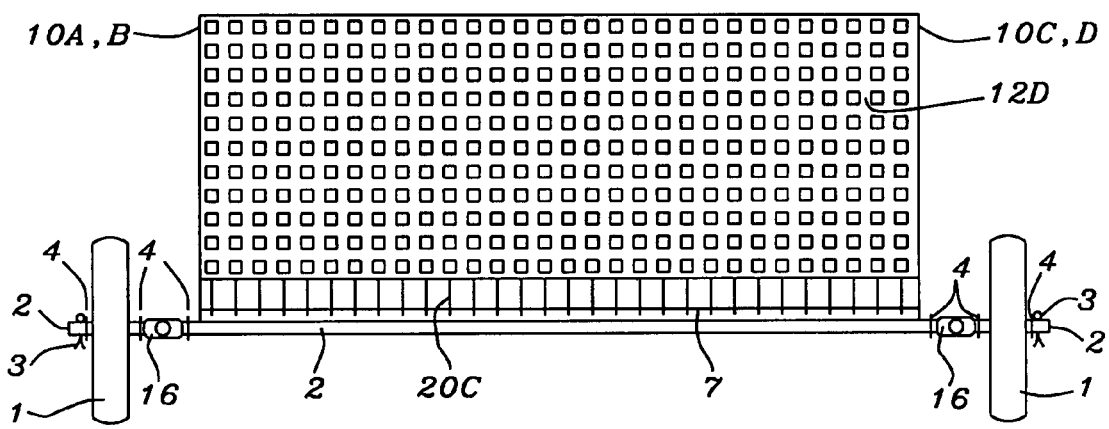
FIG. 2B is a front elevation view of the apparatus showing the relationship of the plant cutting filament to the water body bottom.
Figure 2C:
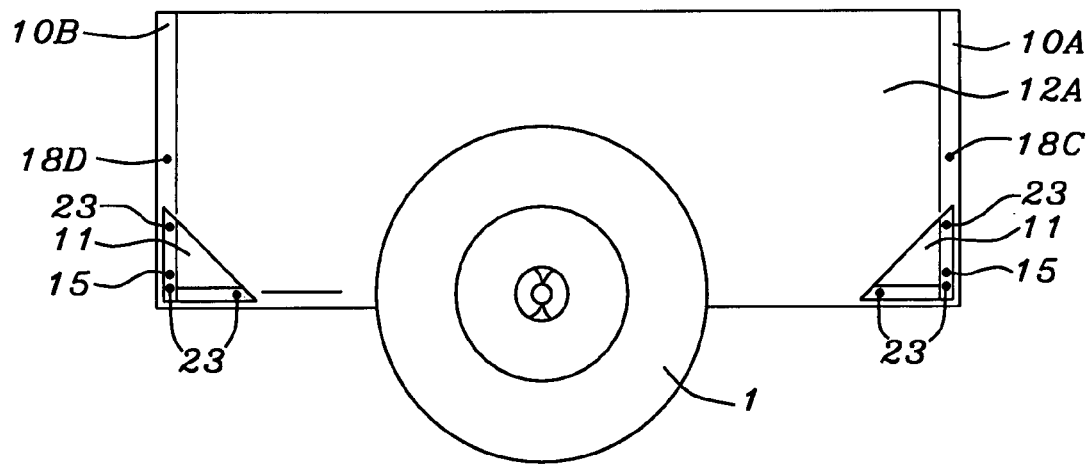
FIG. 2C is a side elevation view of the apparatus showing the vertical angle bars supporting flexible plastic grid/sheet or net for collecting cut plants.

Referring additionally to FIGS. 2A, 2B and 2C wherein FIG. 2A is an overhead view, FIG. 2B is a front elevation view and FIG. 2C is a side elevation view of harvester 1A of FIG. 1A without the push/pull handle 17.

Figure 3:
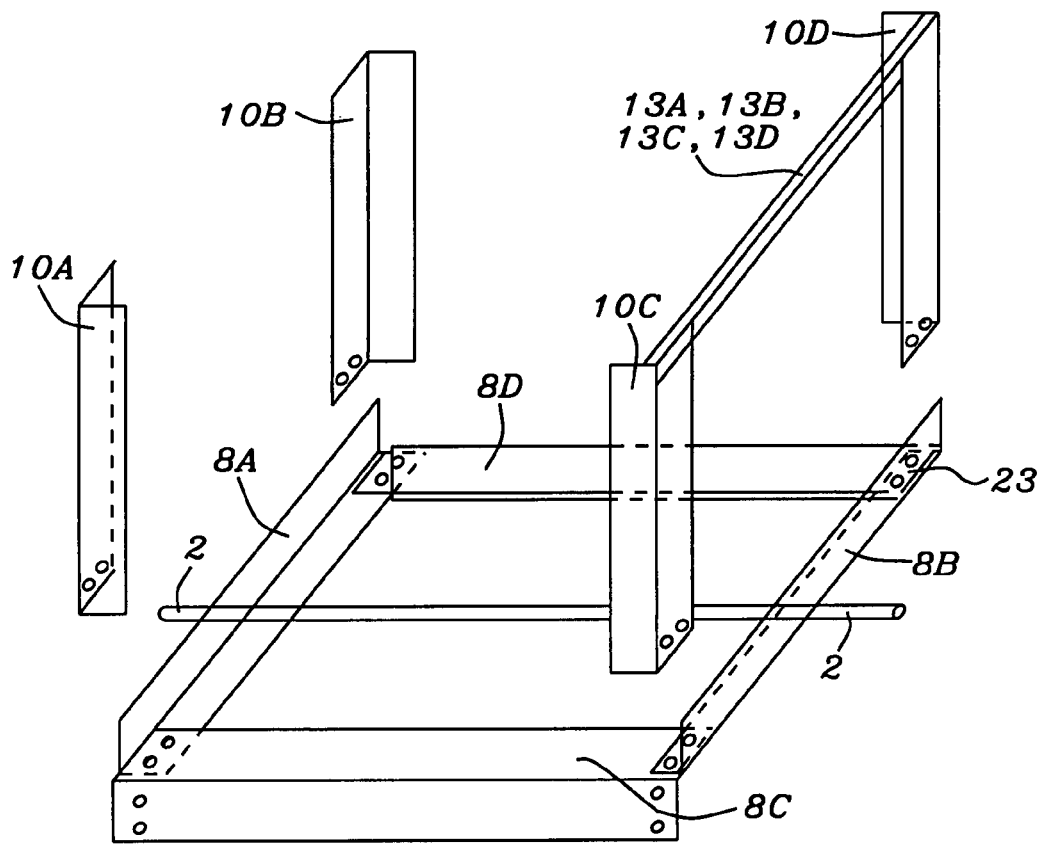
FIG. 3 illustrates the deck frame assembly with vertical angle bars for support of plastic grid and adjusting height of cutting bar above the lake bottom.

Referring to FIG. 3, the harvester deck 6 includes a horizontal, rectangular frame assembly of planar horizontal aluminum angle bars 8A, 8B, 8C, and 8D connected as shown with, for example bolts 23 with washers and nuts for attachment of a deck bottom 6 which supports the harvester 1A load of harvested aquatic vegetation. The deck 6 could be made of perforated plywood, plastic or metal. The mobile harvester 1A deck frame includes front and back aluminum angles 8C and 8D which are assembled with vertical component of the aluminum angle bars 8C and 8D directed downward toward the lake bottom B for attachment of optional cutting bars 20A as seen in FIGS. 5A, 5B, 5C, 5D with a plurality of planar, aquatic plant stem guides and compaction bars 20C with optional transverse stainless steel cutting filament 7 having, for example wire diameter of the order of 0.01 to 0.029 inches. An optional attachment of replacement bar is shown in FIG. 5D using accessory transverse add-on bar 20A with triangular knives 20B and metal cutting filament 7 or with optional attachment of replacement bar 20A with planar threaded fastener guides 20C with transverse cutting filament 7. Aquatic plant cutting filament 7 is fastened to bars 20B or 20C by filament tension hardware 24 shown in FIGS. 5B, 5C and 5D. It is an option of the operator to use the stainless steel cutting filament 7 with methods 20B or 20C to enhance plant stem cutting efficiency where stem coarseness, strength or number of plant stems per square foot is more efficient for any given situation. Add-on optional attachment bars with 20A, 20B or 20C are simply bolted onto the front or back aluminum angles 8C or 8D of the harvester frame. Planar bars 20A, triangular cutting blades 20B and threaded fasteners 20C guide and wedge plant stems into transverse cutting filament 7 which is common to 20A, 20B or 20C alternatives.

Transverse cutting filament 7 or optional device could be attached in a moveable planar mode, for example, with a spring attached at one end of device 7 connected by rope to a lever on handle 17 (not shown in drawings) and lever actuated manually by harvester operator to move cutting device transversely through aquatic vegetation to enhance efficiency.

Several methods are available for planar transverse back and forth movement of triangular cutting/abrading devices. Examples are (1) single or multiple pulley sheave system with rope/cable connector to cutting device with attached extension spring fixed to harvester apparatus; (2) compressed gas cylinder with attached piping/valve/piston mechanically connected to cutter blade and extension spring; (3) rotatable wheel with attached cam and mechanical connection to cutting device and extension spring attached to apparatus, which is not applicable in the skimming mode. Because of mechanical complexities, corrosion risks in aquatic environment and cost considerations, option (1) simple, rope pulley system with triple sheave and extension springs is the preferred embodiment for this invention. Options (2) and (3) are also described as alternatives.

Figure 11A:
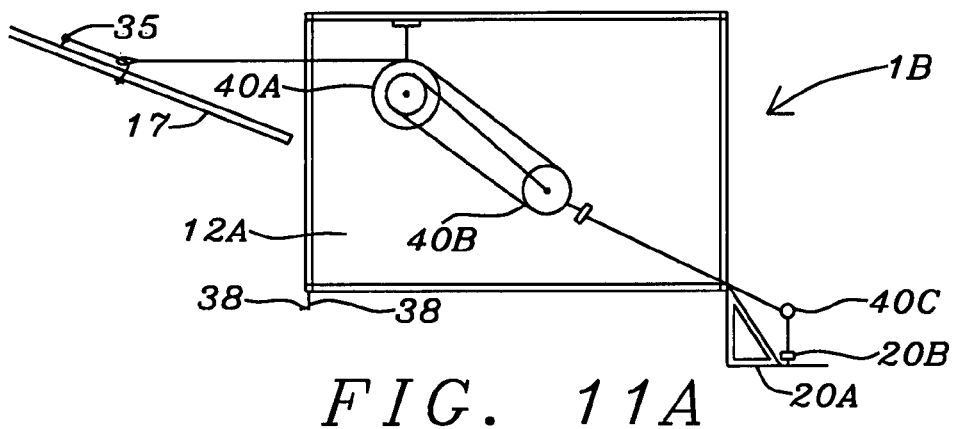
FIGS. 11A, 11B, and 11C, showing details of side elevation view (11A) and (11B) of bottom cutting or skimming aquatic vegetation harvester and (11C) a top view of positioning and assembly of the aquatic stem collecting and cutting device. In particular 11A shows a pulley sheave system (method 1) of one or more pulley sheaves and an extension spring attached to triangular cutting blades for manual back and forth planar movement of the blades. As shown, one blade may remain stationary while the other blade is manually moved by action of the rope-pulley sheave and extension spring system.

Referring to FIG. 11A harvester 1B using preferred bow saw triangular cutting blade 20B supported on aquatic plant collection/compaction guide bar 20C under upper bow saw blade 20B is transversely moved in back and forth mode by pulling lanyard rope 35 passing through the multiple sheave pulley system 40A and 40B, thereby gaining mechanical advantage, then to single sheave pulley 40C that is connected to triangular cutting/abrading blade by steel tension wire 39 which moves lower blade 20B against extension spring 36 attached to cutter blade 20B and to harvester apparatus 1B. On release of lanyard 35, extension spring 36 moves cutter blade 20B back to its original position. Transverse movement of lower cutter blade 20B against upper blade 20B cuts/abrades aquatic plants which are collected by guide bar 20C and then pass into or on harvester removable enclosure plastic grid 12F. Obviously upper and lower cutting blades could be in reverse position. Tension filament wire 7 at the back end of the apparatus acts as a scavenger cutter for aquatic plants not cut by the front end blades.

Figure 1B:
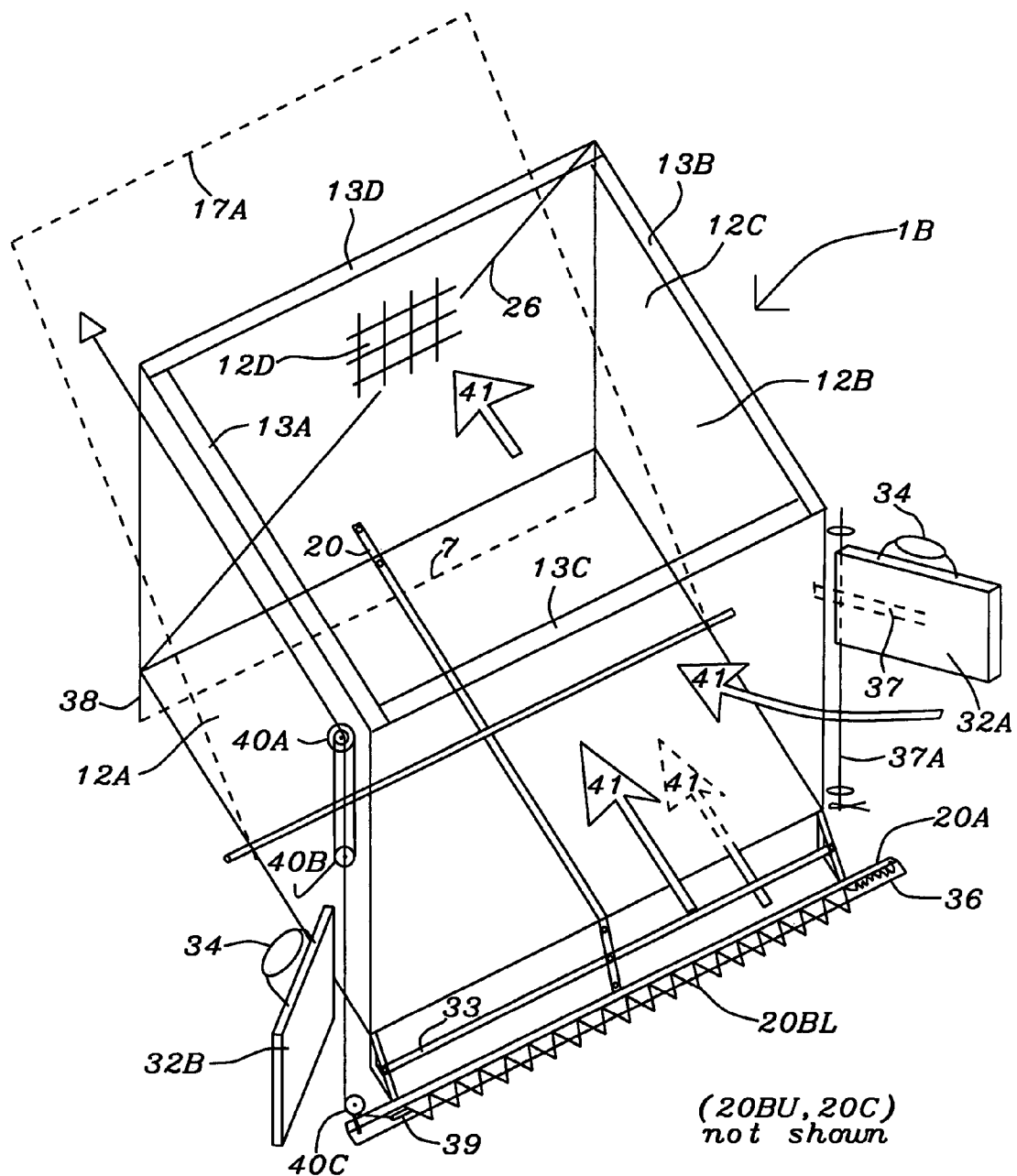
FIG. 1B is a perspective view of the aquatic plant cutting/skimming harvesting apparatus of the present invention with moveable triangular cutting blades and hydraulic flow guides.

FIG. 1B shows vertically moveable hydraulic flow guide bar 33 at front of harvester which adjusts the ratio of lake water entering harvester enclosure to lake water passing under harvester deck 6.

FIG. 1B also shows steel tension filament 7 attached to the back end of harvester 1B by angle bar 38 extending 4-6 inches below harvester deck 6 that serves as a scavenger cutter/abrading device of aquatic vegetation that escaped harvesting by the front end bow saw blade cutting system 20B.

FIG. 1B illustrates perspective view of floatable vertical hydraulic flow guide boards 32A, 32B for harvester 1B in skimming mode which act as a hydraulic scoop drawing floating aquatic vegetation/algae into harvester enclosure.

Figure 12A:
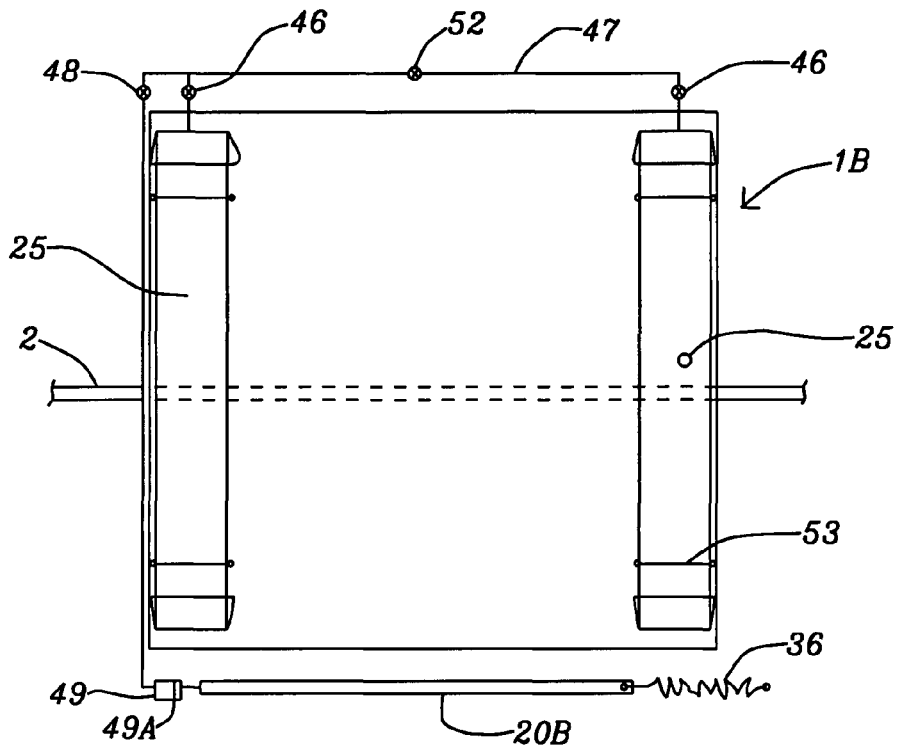
FIGS. 12A, and 12B show top and bottom plan view details of the compressed gas Method (2) for the manual back and forth movement of cutter blades with gas cylinders, piping, valves, gas actuating cylinder and compression/extension springs.

Referring to FIG. 12A there is shown in the plan view of harvesting apparatus 1B method (2) of cutting device movement using plastic/metal compressed gas cylinders 25 connected by valves 46 and fill valve 52 connected by metal plastic piping 47 to initiator lever ball valve 48 that directs gas/air to spring loaded actuating cylinder 49 the piston of which moves triangular cutting devices/bow saw blades 20B which in turn are connected mechanically to compression/extension spring 36 attached to the harvesting apparatus. The spring of the actuating cylinder 49 returns cutting blade to the original position until the movement is repeated.

FIG. 1B illustrates methods and devices for guiding/controlling hydraulic flow patterns to enhance efficiency of lake bottom cutting and surface skimming of the harvesting apparatus. To minimize the forward bending over of bottom growing aquatic plants during bottom harvesting, guide bar 33 is moved vertically up or down to adjust the ratio of water flowing into the harvester enclosure or under the harvester deck. Additionally this ratio is affected by the mesh opening size of perforated metal/plastic enclosure 12D at the back end of the apparatus 1B.

FIG. 1B additionally shows optional buoyant floats 34 that during skimming operations automatically position at the water body surface to minimize water current by-passing around the side of the harvester instead of flowing into the harvester enclosure, thus acting as a hydraulic scoop which can be set at selected angles.

FIG. 1B shows a separate, removable section of flexible plastic grid 12F inside the harvester enclosure which collects harvested vegetation. When enclosure is full the harvester is manually moved to shore where pulling the inner flexible grid 12F to the front of harvester 1B easily removes the collected aquatic vegetation in the form of a large green sausage-like roll.

Figure 12B:
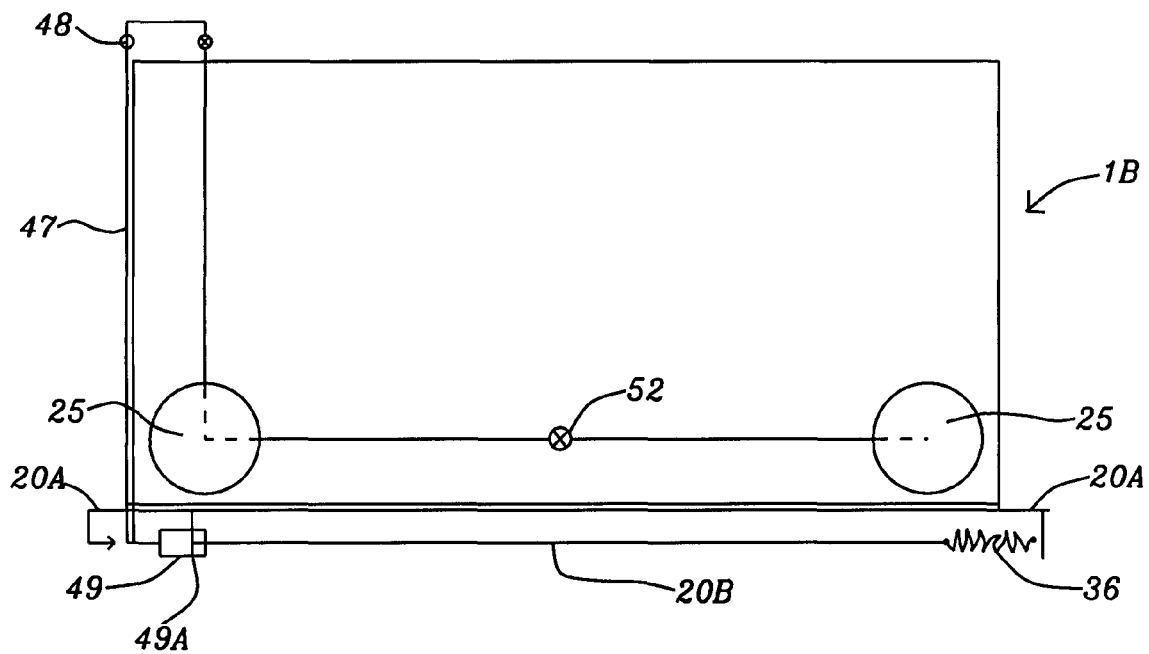
Figure 12C:
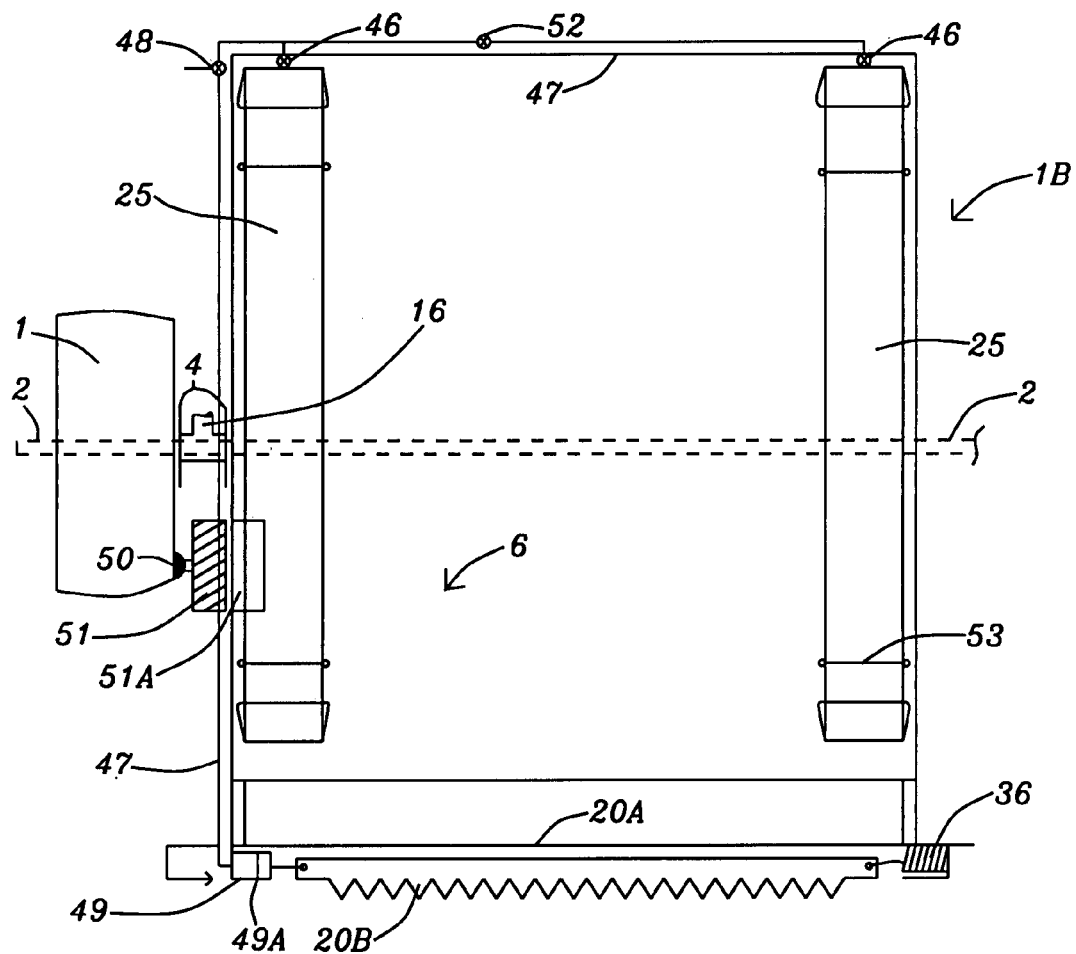
FIGS. 12C, and 12D show plan and front elevation views of the Method (3) using one of the harvester rotating wheels with a cam device contacting a gas actuator valve which supplies compressed gas to a gas actuating cylinder connected to a bow saw cutter bar with compression/extension spring attached to harvesting apparatus.
Figure 12D:
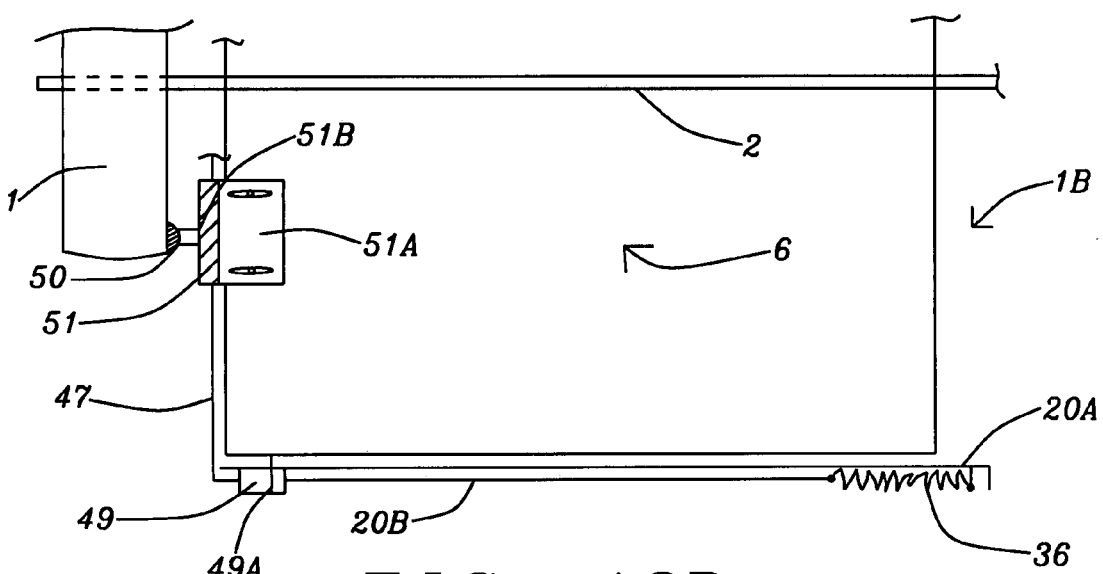

Referring to schematic FIG. 12C the plan view from the top of harvester 1B illustrates a third Method (3) of manually moving transverse cutting blades 20B of harvester 1B by attaching a cam device 50 to one of the rotating wheels 1 with cam device 50 positioned to contact the activation button of gas actuator valve 51 attached to deck 6 support angle bar 8A of the apparatus. Plan view from the bottom of harvester 1B support plate 51A for gas activator valve 51 shows transverse slots for adjustment of activator valve 51 to properly align the push button 51B to wheel 1 cam 50. Plastic/metal compressed gas cylinders 25 on deck 6 of harvester 1B provide gas supply through valves 46, 48 and plastic/metal piping 47 to gas actuator valve 51. When cam 50 on rotating harvester wheel 1 contacts and pushes in the button 51 B of gas actuator valve 51 on each rotation of wheel 1 gas/air flows through plastic/metal pipe 47 to gas actuator cylinder 49 forcing the cylinder rod mechanically connected to triangular cutting bow saw blade 20B to move horizontally cutting/abrading aquatic vegetation. A compression spring in gas actuator cylinder 49 moves the cutter blade back to original position. Cam device 50 is fastened on the inner side of hollow wheel 1 near the circumference and positioned to push button 51B of activator valve 51 when rotating adjacent to this valve. When the harvester is full of aquatic vegetation using this method of moving the bow saw cutting blades the harvester is manually moved to shore and unloaded in similar manner described in FIG. 12A method.

Figure 11B:
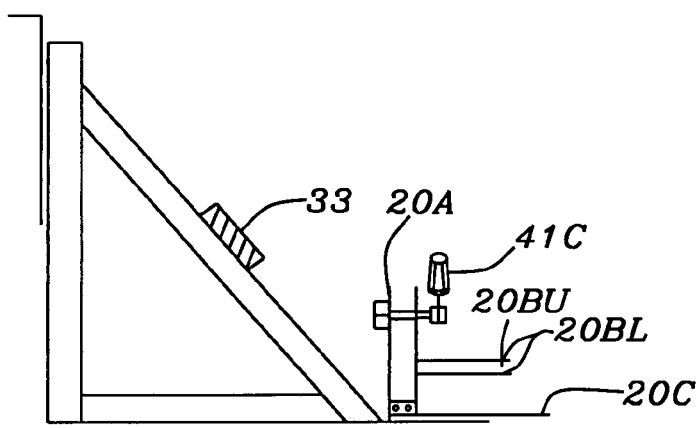
Figure 11C:
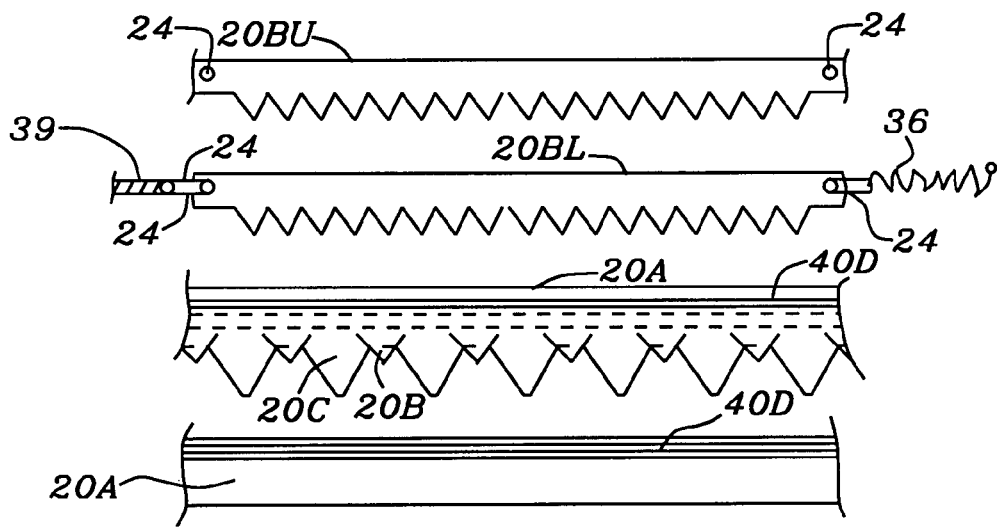

Referring to FIGS. 11A, 11B, 11C using preferred bow saw triangle cutting blade 20BL supported on aquatic plant collection/compaction guide 20C and directly under bow saw blade 20BU is transversely moved in back and forth mode by pulling lanyard rope 35 passing through the triple sheave pulley system 40A and 40B with mechanical advantage to single sheave pulley 32C which is connected to triangular cutting/abrading blade by steel tension wire 39 which moves lower blade 20BL against extension spring 36 attached to cutter blade 20BL and to harvester apparatus 1B. On release of lanyard 35, tension spring 26 moves cutter blade 20BL back to its original position. Transverse movement of lower cutter blade 20BL against upper blade 20BL cuts/abrades aquatic plants which are collected into or on harvester enclosure 12F. Obviously upper and lower cutting blades could be in reverse position.

Referring to FIG. 11 shows vertically moveable hydraulic flow guide bar at front of harvester which adjusts ratio of lake water entering harvester enclosure to lake water passing under harvester deck 6.

Referring to FIG. 12B show steel tension filament 7 attached to the back end of harvester 1B by angle bar 38 extending 4-6 inches below harvester deck 6 and serves as a scavenger cutting/abrading device of aquatic vegetation that escaped harvesting by the front end bow saw blade cutting system.

Referring to FIG. 1B illustrates perspective view of floatable vertical hydraulic flow guide boards 32A, 32B for harvester 1B in skimming mode which act as a hydraulic scoop drawing floating aquatic vegetation/algae into harvester enclosure. Guide boards can be set at selected angles to the vertical by guide 37.

Figure 5A:
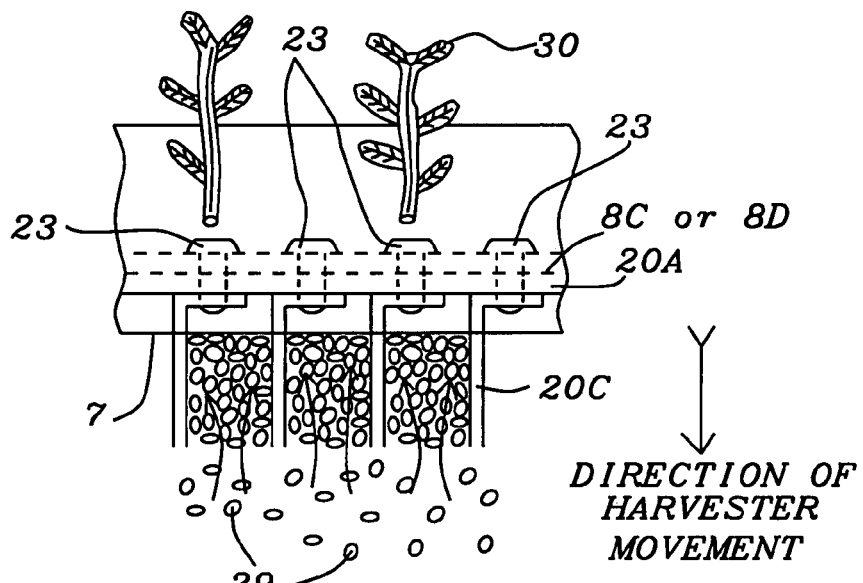
FIGS. 5A, 5B, 5C and 5D show three methods and optional devices of the invention for abrading and cutting bottom growing aquatic plants.
Figure 5B:
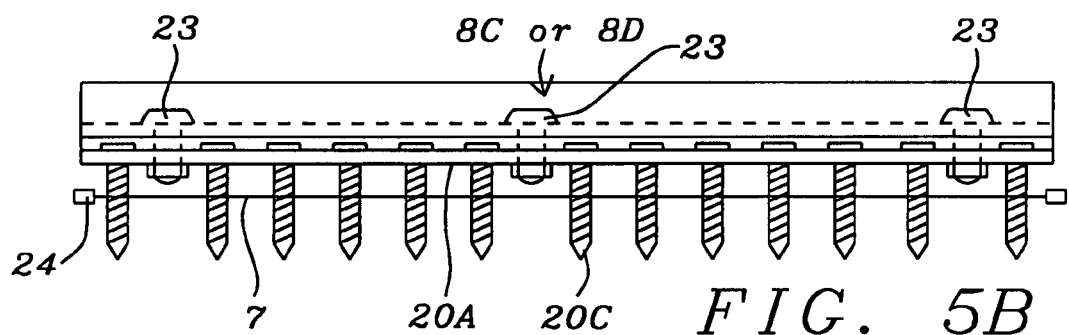
Figure 5C:
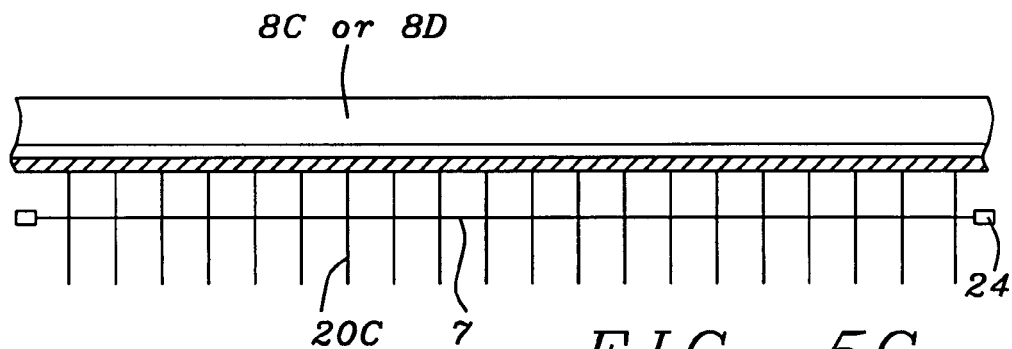
Figure 5D:
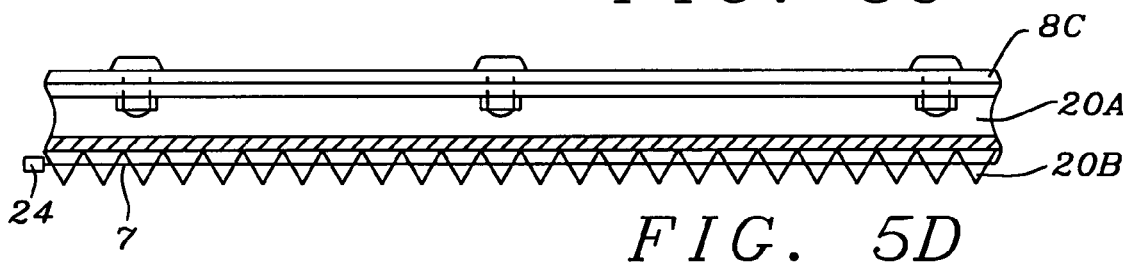

Referring to FIG. 5A, a fragmented and exploded view of planar deck 6 is shown wherein plant stem guide compaction bars and stainless steel filament 7 illustrate aquatic plant stems 29 cut typically 6 to 8 inches above the lake bottom being compacted within the spaces between guide bars 20C and wedged against metal cutting filament 7 wherein plant stems 29 are severed and cut plants 30 flow and are collected into removable plastic grid or net 12F. Obviously, the compaction and indexing process is applicable to cutting methods 20B and 20C.

Referring to FIGS. 1A, 3, and 5A, 5B, 5C, 5D, an important objective of the present invention is shown wherein the bottom growing aquatic plants 30 in FIG. 5A are severed at a predetermined distance above the water body bottom B to minimize the disturbance of the lake bottom sediment ecology which could otherwise result in the release of benthic phosphorus back into the water and thereby enhancing more aquatic plant growth. This is achieved by limiting vertical movement of 20A (attachment bar), 20B cutting bar (planar cutting bars with optional bars with optional cutting devices), 20C (optional plastic/metal plant stem guide bar) selectively attached to harvester deck bars 8C and 8D by use of bolts 13. The preferred embodiment is to attach push/pull handle 17 securely to eyebolts 18A, 18B, 18C, 18D fastened to vertical deck angles 10A, 10B, 10C, 10D at the appropriate height for the harvester operator. Three bolt holes through each said deck angles at 5, 6 and 7 inches above deck 6 are adequate (see FIG. 7B). Handle 17 is secured to said eyebolt by means of serrated plumbing clamps, making easy removal for switching direction of vertically movable handle 17. This method effectively limits the aquatic plant cutting distance of bars 20A, 20B, and 20C to a minimum of for example, about 6 inches above lake water bottom B in either push/pull mode. FIG. 7B shows holes where eyebolts will connect harvester handle to vertical angles 10A, 10B, 10C, 10D.

Figure 7A:
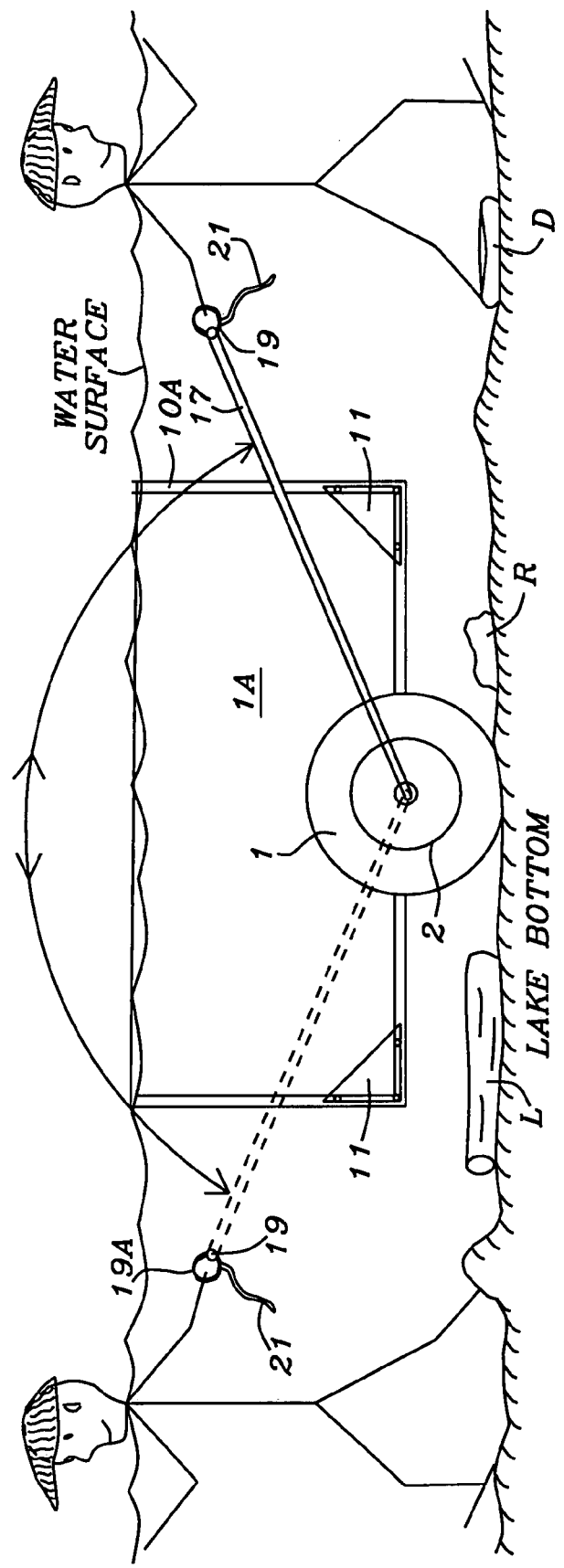
FIGS. 7A and 7B illustrate the method of manually operating the harvesting device on lake bottom by an elevation view of the vertically mobile handle and method of maintaining the plant cutting devices clear of bottom object and debris.
Figure 7B:
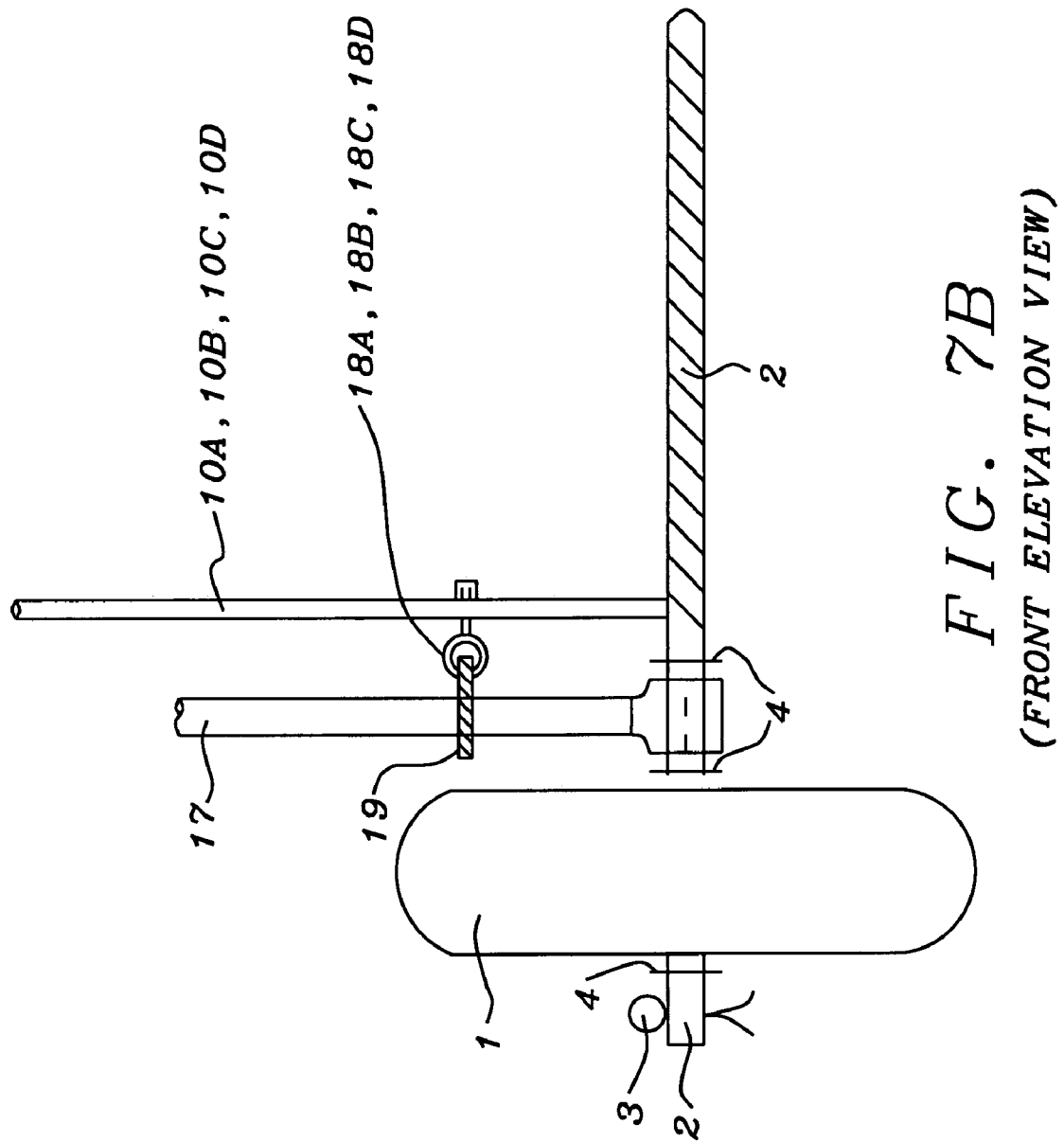

In addition to cutting aquatic vegetation above said water body bottom B as described above the present invention positions the aquatic plant cutting devices 20A, 20B and 20C at sufficient distance above said water bottom B so that harvester 1A can be pulled or pushed by one person above and over the most common bottom laying objects, such as rocks R, logs L or debris D that would impede or block the manual pulling or pushing of the harvester along the water body bottom B as shown in FIG. 7A and FIG. 7B.

An improved mobile multifunctional apparatus and method is shown in FIG. 1A and FIGS. 2A, 2B, 2C, 2D where sections of flexible, plastic grid or net illustrated as 12D, removable 12F collect cut aquatic plant stems 29 as the harvester is pulled or pushed through the water body. The plastic/metal sheet sections 12A, 12B, 12C are attached to the vertical aluminum angle bars shown in FIG. 3 as 10A, 10B, 10C 10D of the harvester 1A by means of bolts. The top plastic/metal sheet is attached by bolts to top transverse angle bars 13A, 13B, 13C, 13D. Other means could be used to secure the plastic grid or net 12F to the harvester frame, for example spring loaded snap hooks.

The front and back sections of plastic grid 12C and 12D as seen in FIG. 1 are removable depending on the direction of said harvester 1A movement such that the cut aquatic plants 29 flow into the harvester plastic sheet 12A, 12B, 12C, 12D opposite to direction of motion of said harvester where the front section of the plastic grid 12D has been temporarily removed for cutting. A removable section of plastic grid 12F previously placed on the deck 6 of said harvester 1A before harvesting is started, is connected by snap hooks, eye bolts at the bottom and top of back plastic grid 12D. 12C is the top plastic sheet as seen in FIG. 1A and bolted to harvester top angle bars 13A, 13B, 13C, 13D. For dumping the harvested water body vegetation at an onshore location the back section of said plastic grid 12F is disconnected from the harvester aluminum frame verticals 10B and 10C. By manually pulling plastic grid section 12F from the back to the front of the harvester 1A, for example the cut vegetation is deposited onshore for dewatering and subsequent transporting to a composting location for reuse of the nutrient phosphorus contained in the removed vegetation for gardening or other agricultural or alternative energy projects uses for biomass.

Figure 4:
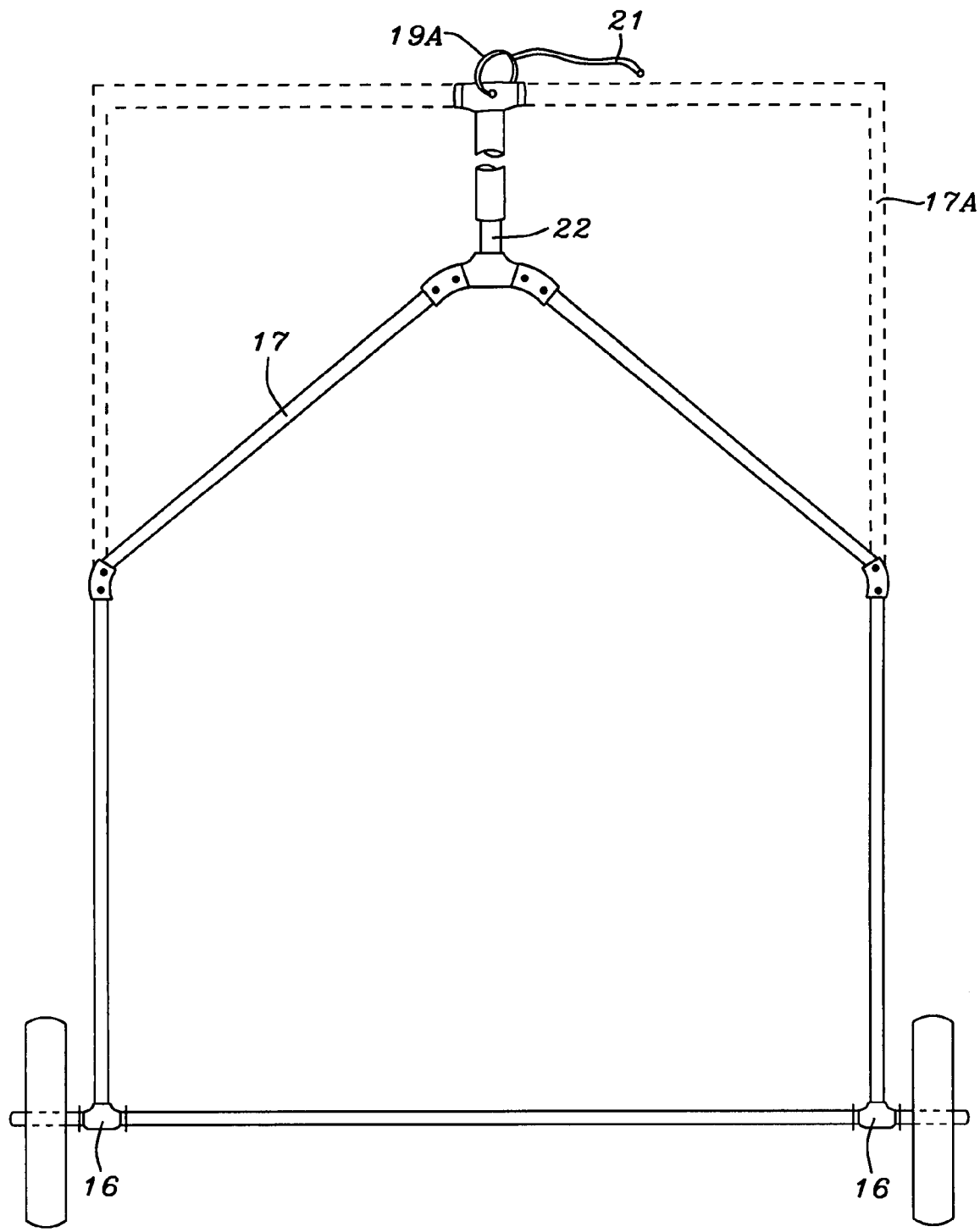
FIG. 4 is a perspective view of the handle components for pulling or pushing the harvesting apparatus.

The push or pull handle 17 shown in FIGS. 1A, 4, and 7A can be operated by one person from either end of said harvester. The vertically movable handle 17 is comprised of a rigid pipe and appropriate fittings and is connected to said harvester 1A at axle 2 inside of each wheel 1 to rotatable, pipe "Tees" 16 at the inside of each wheel of said harvester 1A as seen in FIG. 2A. The "Tees" 16 are fitted with nipple inserts on the long axis and over axle 2 to take up slack of vertically mobile handle 17, bolted to "tee" 16. The handle 17 extending from the harvester axle 2 at each wheel 1 are configured to a single rigid handle using standard pipe and fittings. A grip 19A or draw bar 20 composed of piping, metal is useful for manually pushing or pulling harvester 1A offshore or on shore. As illustrated in FIG. 7B, the handle 17 is moveable vertically in an arc of 180 degrees to pull or push said harvester 1A, cut and harvest aquatic plants by simply moving the handle 17 overhead to the opposite end of the harvester.

Referring to FIGS. 6A and 6B, there is shown an optional cutting structure and method that use planar triangular knives 20BL, 20BU. Planar triangular knife 20BU are attached with bolts to aluminum angle bars 20A and frame angle 8C at either front or back of the harvester frame. The transverse cutting filament 7 is shown, for example positioned about ½ inch from the "V" notch formed by adjacent triangular cutting blades. Optionally, transverse cutting filament 7 is positioned at the back end of the harvester about 4 inches below deck 6 and mechanically fastened to 38 downward projections at vertical angle 10B and 10D (FIG. 1A)

Referring now to FIG. 6C and FIG. 6D, there is shown a cutting structure and method that uses vertical plant stem guide and compaction bars 20C bolted to optional attachment bar 20A. Transverse cutting filament 7 is shown passing through the bar 20C at a distance of, for example 1 inch from the support bar 20A.

Figure 8A:
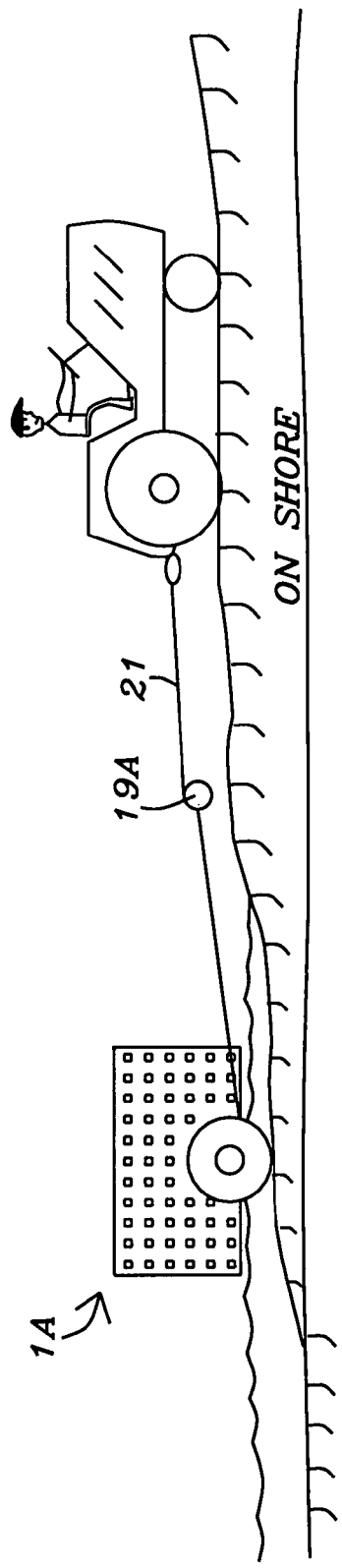
FIGS. 8A and 8B show perspective views of the harvesting apparatus being pulled by offshore and onshore optional auxiliary powered devices.
Figure 8B:
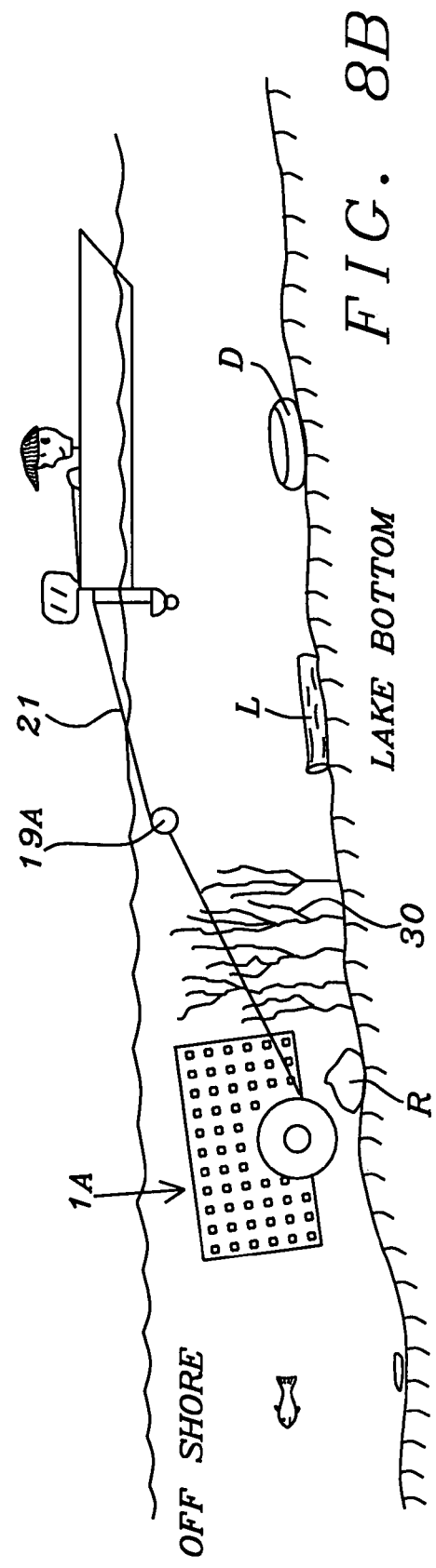

Referring to FIGS. 8A and 8B, it is shown how the harvester can be used with the aid of onshore or offshore power equipment. Ring 19A is provided at handle grip 22 for optional connection by rope, chain or cable to an offshore powered device, such as a boat seen in FIG. 8A or onshore tractor as seen in FIG. 8B or winch to move harvester 1A.

The mobility of the manual harvester 1A can be improved by balancing the loaded equipment weight against the harvester buoyancy. Since the in-water density of the harvested aquatic plants is about the same as water, the in-water weight of the harvester 1A may be considered a constant whether full or empty of harvested vegetation 29, except possibly for friction factors. By adjusting air volume in the plastic wheel 1 and if necessary by attachment of a variable floatation device 31 which can be air-filled or water-filled wheel to the harvester deck 6, the wheel-load on the lake bottom B is adjusted for maximum mobility of the harvester 1A for a given situation of lake bottom B firmness.

The following is the summary of a numbered part of this harvesting apparatus.
1 hollow wheels filled with air/water mixture
1A harvester
1B harvester
2 steel axle for harvester wheels
3 cotter pin through axle to hold wheels in place
4 washers to hold wheels in place against cotter pins
6 harvester deck
7 transverse stainless steel tension filament or optional manual movable cutting devices such as bow saw blades with numerous transverse teeth for cutting/abrading plant vegetation
8A,B,C,D horizontal aluminum angle deck frames to support deck and aquatic plant cutting attachments
9 pipe "U" bolts for fastening deck frame to harvester axle
10A,B,C,D vertical aluminum angle bars to support flexible plastic grid that collects cut aquatic plants
11 optional galvanized metal reinforcing plates for support of
vertical aluminum angle bars
12 D separate sections of flexible plastic grid with selected opening to collect aquatic vegetation at back end of harvester
12A,B,C,E metal/plastic sheet enclosure to collect cut aquatic vegetation at back end of harvester
13A,B,C,D angle bars to support plastic or metal sheet harvester top
15 bolt through aluminum vertical angle for
attachment of flexible plastic or metal sheet enclosure
16 pipe "Tees" over axle to attach movable harvester handle
17 movable harvester handle
17A Optional arrangement of harvester handle
18A,B,C,D,E,F eye bolt through the deck vertical aluminum
angles 10A, 10B, 10C, 10D for attachment to clamps on harvester handle to control vertical height of deck above lake bottom
19 serrated steel clamp fastening handle 17 to eyebolts through vertical angles of harvester 1A
19A steel ring connection for pulling harvester, on shore or off shore with optional use of power devices
20 metal bar fastened to harvester deck with hitch device for connection of harvester for optional use as a hauling cart for onshore or offshore use 20A accessory transverse aluminum angle bar for attachment of optional cutting/abrading methods.
20B bow saw triangular knives, metal bars and optional metal cutting devices (20BL, 20BU not shown on some drawings)
20C one of a plurality of vertical closely spaced planar metal bars to guide plant stems into the cutting filament 7 or optional triangular blades
21 rope or cable for pulling harvester with optional powered device offshore or onshore
22 pipe and fittings for extension of harvester handle assembly
23 harvester assembly bolts for each frame and attachable bars with cutting devices
24 metal filament tension fitting
25 compressed gas plastic or metal cylinders
26 diagonal reinforcing bar for stabilizing back end of harvester enclosure
29 cut vegetation stems 30 aquatic plants
31 optional buoyancy control tubes for harvester deck
32A,B vertical floatable hydraulic flow guides to move floating aquatic vegetation/algae into harvester collection in skimming mode
33 vertically moveable metal/plastic bar at front cutting end to adjust ratio of hydraulic flow into harvester aquatic vegetation enclosure to flow under harvester dock
34 optional floatation device for vertical floatable hydraulic flow guides
35 lanyard rope that moves triangular cutting devices through pulley sheave system
36 extension spring that moves cutting devices liquid drain cock that controls water/air mix in wheels for desired buoyancy
37A aluminum rod through eye bolts to support floatable hydraulic flow guide boards with angle selection devise 37
38 vertical angle bar that supports metal tension wire 7 at back end of harvester that cuts vegetation not harvested by front end cutting device
39 steel tension wire for mechanical connection of cutting device components
40 A,B,C one or more pulley sheave systems and tension spring to manually move triangular cutting devices in planar back and forth mode
40D metal or plastic spacer to extend cutter blades that enable direct contact of blades with compacted aquatic plant stems
37 Direction of hydraulic flow through harvester/skimmer by guides 32 A,B and 33.
38 Openings in wheels to allow water/air to in and out
44 removable drain plugs or water/air threaded drain cocks to control flow of water/air in or out of the wheels for buoyancy control
46 plastic or metal gas gate valves
47 plastic or metal gas piping
48 manual PVC lever supply ball valve feeding gas to actuator cylinder
49 gas actuated cylinder
50 cam device on harvester wheel that contacts gas actuator cylinder on each revolution of harvester wheel
51 metal/plastic gas flow actuator valve with push button that contacts wheel cam
51A metal support plate for gas flow actuator valve
52 gas cylinder fill valve
53 u-bolt fastening hardware for compressed gas cylinders The related Shonnard patent cited above highlights the bottom vegetation harvesting method and not the skimming method of removing algae and floating vegetation from water surfaces. However, that patent does refer to wheels filled with air or other media for adjusting the buoyancy and therein the distance of the harvester deck above the water body bottom. This implies wheels of various sizes filled with a mixture of air and water for the purpose of adjusting the harvester buoyancy so as to function (1) as a floating surface skimming device; (2) a harvesting apparatus moving along the water bottom and (3) a harvester functioning at any distance between the water surface and the bottom of the water.

Additionally, in both surface skimming and lake bottom harvesting modes use of an anchored floating mooring buoy with a pulley and marine ropes attached to the harvester handle 17 in deep waters allows the harvester 1A to be moved forward or in reverse direction manually from shallow waters when buoyancy factors in deeper water result in the operator losing foot traction on the water bottom.

Figure 9A:
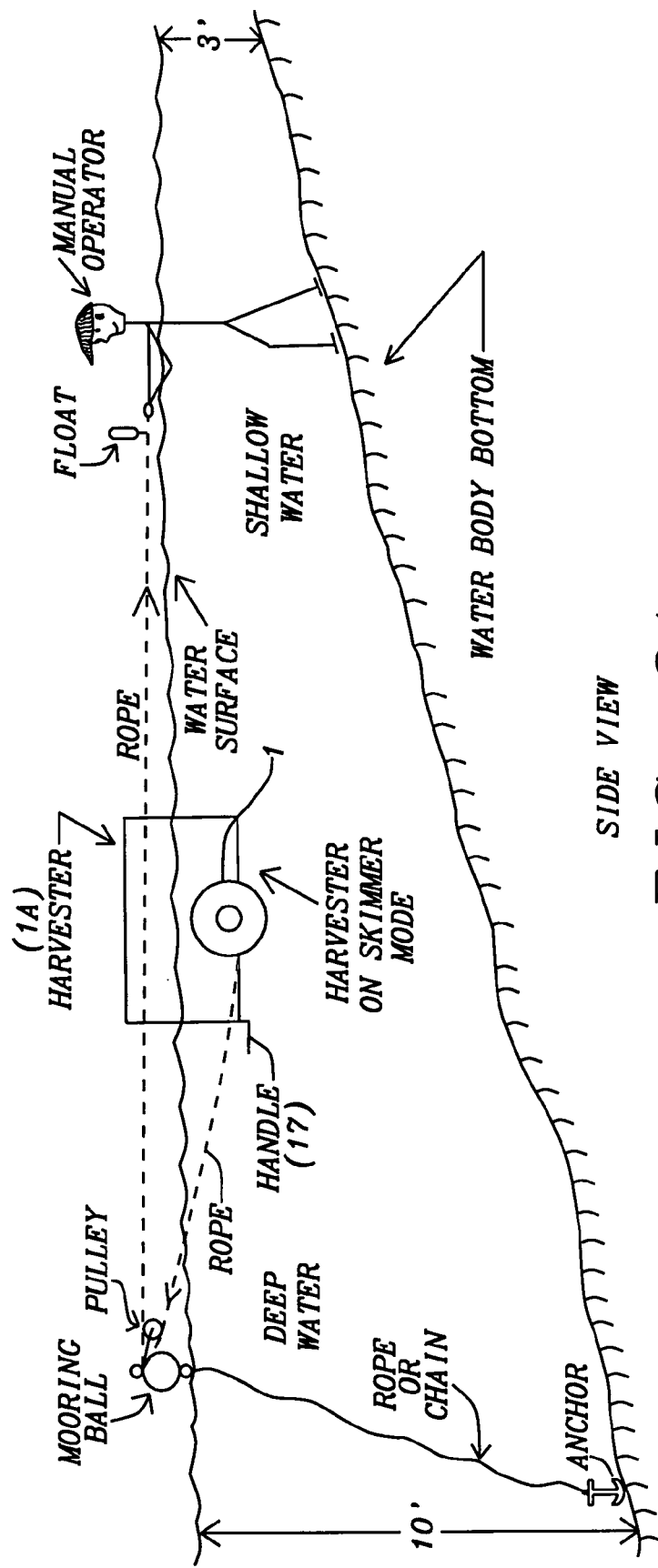

Referring to FIG. 9A, there is shown a side view of the harvester 1A in the skimmer mode. In this mode the buoyancy of the plastic wheels are adjusted with air and water so that the harvester floats and can skim the algae and floating vegetation (not shown). The use of the anchor tied to a mooring ball with a rope or chain is shown. A pulley is attached to the mooring ball by rope to the harvester and to a float controlled by the manual operator in shallow water. With this method it is possible to, with control, do the skimming of a water surface.

Referring to FIG. 9C, there is shown a side view of a harvester 1A in the deep water bottom harvesting mode. In this mode the buoyancy of the plastic wheels are adjusted with air and water so that the harvester is at or close to the bottom to harvest and cut vegetation without damaging the bottom of the water body. The anchor and pulley operation method is the same as with FIG. 9A and controlled cutting of the vegetation is possible without actually seeing the vegetation in deep water.

Figure 9B:
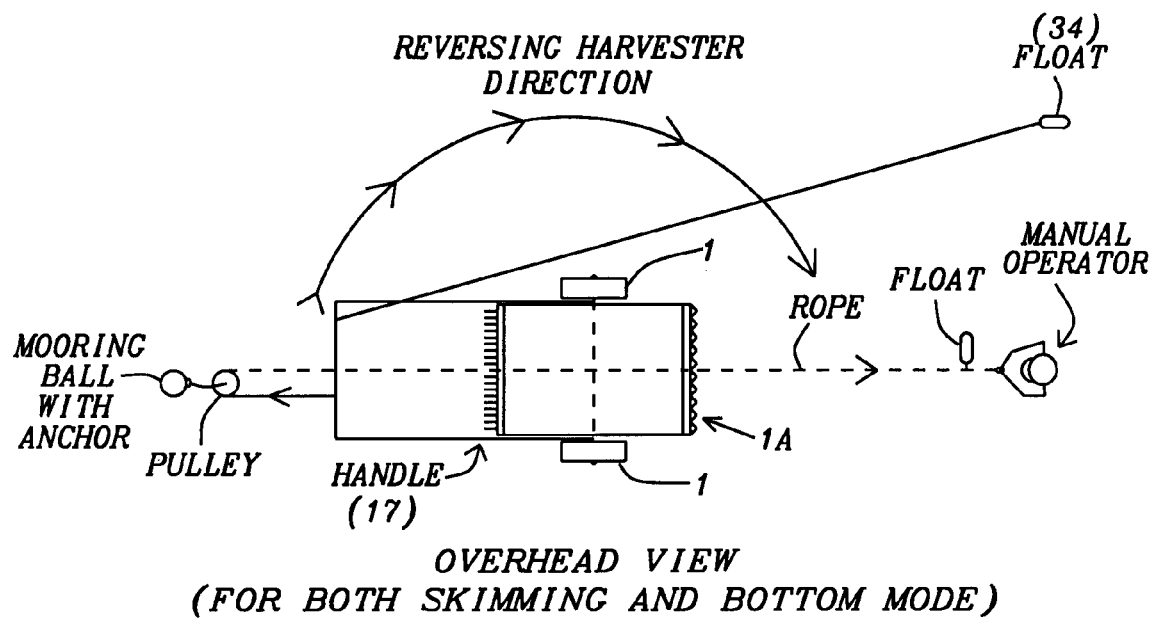

Referring to FIG. 9B, there is shown an overhead view that is applicable to both the skimming and bottom cutting modes. There is shown a float 34 that is attached to handle 17 that allows the reversing harvester direction from shallow water by the manual operator.

Figure 10A:
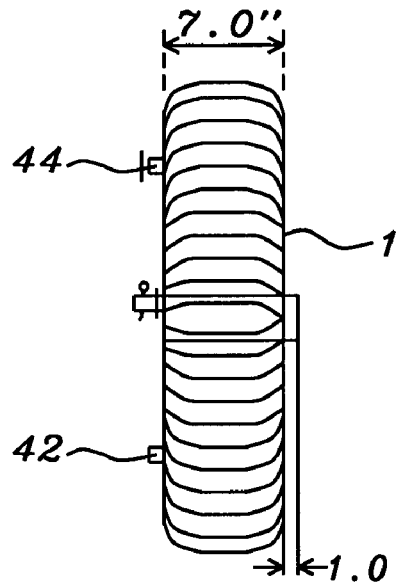
FIGS. 10A and 10B show views of the hollow wheels that can contain air and water to provide mobility and floatation adjustment for the harvester in either the bottom harvesting or skimming harvesting mode.
Figure 10B:
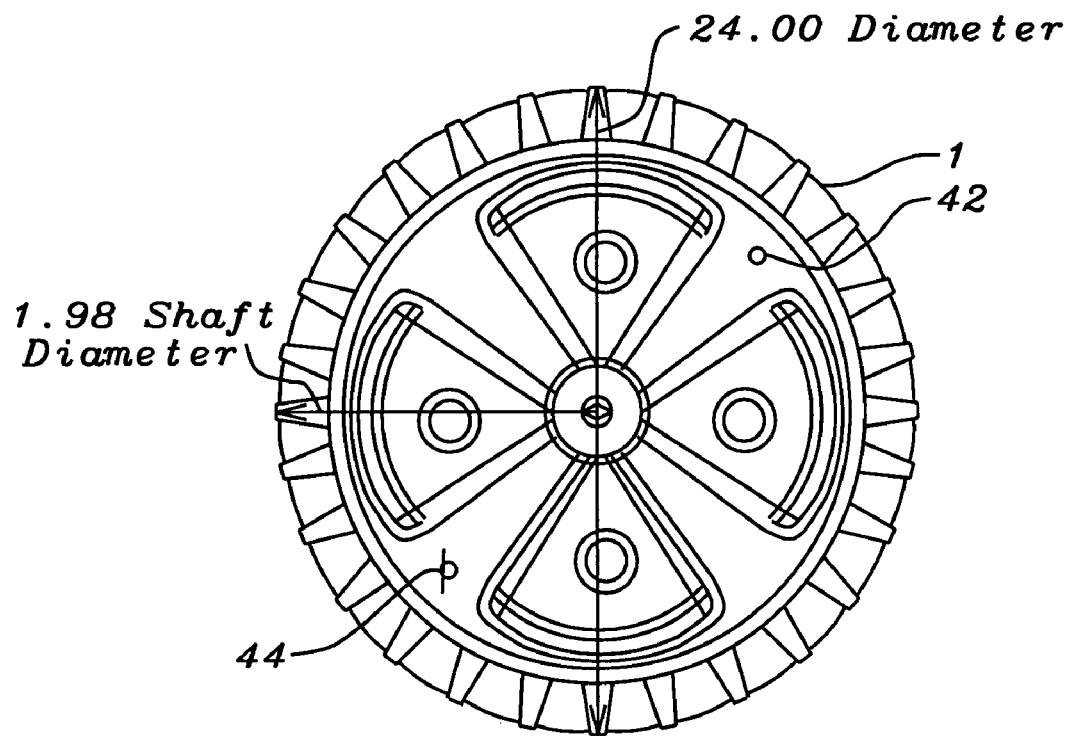

Referring to FIG. 10A and FIG. 10B, there is shown one of the preferred wheels 1 that can be used as the means for providing the needed buoyancy of the harvester 1A. This wheel can be fabricated by molding polyethylene plastic into the hollow wheel shape. There are a chosen number of openings 42 that extend into the hollow wheel. These openings allow water/air to enter the hollow wheel to adjust the buoyancy of the wheel. Plugs 44 or drain cocks can be used to limit the air/water entrance into the wheel and to maintain the desired buoyancy.

Plugs 44 can be, for example, expandable and removable rubber or plastic plugs similar to those used in the stern of row or motor boats to drain rain water from the boats. By inserting or removing the plugs 44 from the preferred number of four holes drilled in the hollow plastic wheels 1, harvester buoyancy can be adjusted by the ratio of air to water inside the hollow wheels for manual harvesting operations along the water body bottom or for skimming at the surface of the water body with the multifunctional apparatus. Optional drain cocks 44 can be secured to wheels 1 as shown in FIG. 10A. Removable drain plays can also be used.

While the invention has been particularly shown and described with reference to the preferred embodiments thereof, it will be understood by those skilled in the art that various changes in form and details may be made without departing from the spirit and scope of the invention.

What is claimed is:

1. A manual mobile apparatus for harvesting bottom growing aquatic vegetation in shallow areas of water that does not disturb the water bottom ecology comprising:
   a perforated self-draining deck with wheels on a transverse axle;
   means for attaching aquatic cutting devices to either or both ends of said deck;
   wherein said aquatic cutting devices comprise a stationary blade, and a moveable blade vertically separated from said stationary blade, wherein said moveable blade is able to be moved back and forth to enhance cutting of bottom growing vegetation, and wherein said moveable blade is connected at a spring end to an extension spring;
   wherein said moveable blade is operably connected, at an end opposite from said spring end, to a gas actuating cylinder and to an actuator valve, said actuator valve operably connected to at least one of said wheels with a cam device wherein when said actuator valve is activated, said gas actuating cylinder causes said moveable blade to move;

a steel tension filament at the back end of the apparatus for cutting any vegetation which said aquatic cutting devices fail to cut;

means attached to said deck including a flexible plastic or metal sheet enclosing the deck on three sides, a plastic top cover and flexible plastic grid with selected mesh-sized openings at the back end of the apparatus to collect the cut aquatic vegetation;

means connected to said wheels to control a minimal distance of said cutting devices above the bottom; and a manual push or pull handle attached to the deck.

2. The apparatus of claim 1 wherein said moveable blade is connected, at an end opposite from said spring end, to a steel tension wire.

3. The apparatus of claim 2 wherein said steel tension wire is connected to single or multiple pulley sheaves.

4. The apparatus of claim 3 wherein said single or multiple pulley sheaves are connected to a lanyard rope at an opposite end of said single or multiple pulley sheaves from said steel tension wire.

5. The apparatus of claim 1 wherein said moveable blade is operably connected to, at an end opposite from said spring end, a compressed gas cylinder.

6. The apparatus of claim 5 wherein said compressed gas cylinder is connected to said moveable blade through piping, valves, and an actuating cylinder, wherein said gas actuating cylinder has a piston mechanically connected to said moveable blade.

7. The apparatus of claim 6 wherein said valves comprise an initiator lever ball valve for directing gas or air to said gas actuating cylinder.

8. The apparatus of claim 1 wherein said wheel with said cam device contacts said actuating valve which supplies gas through piping to said gas actuating cylinder having a piston connected to said moveable blade.

9. The apparatus of claim 1 wherein said handle is vertically movable from front to back over the deck in order to reverse direction of motion of the apparatus without turning the apparatus.

10. A method for harvesting surface growing algae or floating vegetation that does not disturb the water bottom ecology comprising the steps of:

providing a perforated self-draining deck with wheels on a transverse axle;

attaching aquatic cutting devices to either or both ends of said deck;

wherein said aquatic cutting devices comprise a stationary blade, and a moveable blade vertically separated from said stationary blade, wherein said moveable blade is moved back and forth to enhance cutting of bottom growing vegetation, and wherein said moveable blade is connected at a spring end to an extension spring;

wherein said moveable blade is operably connected, at an end opposite from said spring end, to a gas actuating cylinder and to an actuator valve, said actuator valve operably connected to at least one of said wheels with a cam device wherein when said actuator valve is activated, said gas actuating cylinder causes said moveable blade to move;

providing a steel tension filament at the back end of the apparatus for cutting any vegetation which said aquatic cutting devices fail to cut;

collecting the cut aquatic vegetation with a flexible plastic or metal sheet enclosed on three sides, including top cover, attached to said deck;

controlling a minimal distance of said cutting devices above the bottom; and providing a manual push or pull handle attached to the deck.

11. The method of claim 10 wherein said moveable blade is connected, at an end opposite from said spring end, to a steel tension wire.

12. The method of claim 10 wherein said handle is vertically movable from front to back over the deck in order to reverse direction of motion of the apparatus without turning the apparatus.

* * * * *